United States Patent
Shah et al.

(10) Patent No.: US 10,975,303 B2
(45) Date of Patent: Apr. 13, 2021

(54) ADDITIVE FOR SOIL CONDITIONING AND AN AGRICULTURAL COMPOSITION CONTAINING SAID ADDITIVE FOR PLANT GROWTH

(71) Applicants: Shreyas Narendrakumar Shah, Gujarat (IN); Urmil Gunvantrai Desai, Gujarat (IN); Anish Mahendrabhai Amin, Gujarat (IN); Yogendra Kanubhai Patel, Gujarat (IN)

(72) Inventors: Shreyas Narendrakumar Shah, Gujarat (IN); Urmil Gunvantrai Desai, Gujarat (IN); Anish Mahendrabhai Amin, Gujarat (IN); Yogendra Kanubhai Patel, Gujarat (IN)

(*) Notice: Subject to any disclaimer, the term of this patent is extended or adjusted under 35 U.S.C. 154(b) by 0 days.

(21) Appl. No.: 16/555,190

(22) Filed: Aug. 29, 2019

(65) Prior Publication Data
US 2019/0382660 A1    Dec. 19, 2019

Related U.S. Application Data

(63) Continuation of application No. PCT/IB2019/051103, filed on Feb. 12, 2019.

(51) Int. Cl.
| | | |
|---|---|---|
| C09K 17/16 | (2006.01) | |
| A01N 43/12 | (2006.01) | |
| A01N 43/22 | (2006.01) | |
| C05G 3/80 | (2020.01) | |

(52) U.S. Cl.
CPC .............. *C09K 17/16* (2013.01); *A01N 43/12* (2013.01); *A01N 43/22* (2013.01); *C05G 3/80* (2020.02)

(58) Field of Classification Search
None
See application file for complete search history.

(56) References Cited

U.S. PATENT DOCUMENTS

| | | | | |
|---|---|---|---|---|
| 5,698,003 | A * | 12/1997 | Omilinsky | C05C 9/00 71/28 |
| 6,114,284 | A * | 9/2000 | Fujisawa | A01N 37/42 504/140 |
| 2004/0157803 | A1* | 8/2004 | Williams | A01N 37/02 514/151 |
| 2009/0186767 | A1 | 7/2009 | Arbogast et al. | |

FOREIGN PATENT DOCUMENTS

| | | | | |
|---|---|---|---|---|
| CN | 107338055 A | 11/2017 | | |
| WO | WO-2014086854 A1 * | 6/2014 | ............. | A01N 65/08 |
| WO | WO-2018141913 A1 * | 8/2018 | ............. | C05G 3/06 |

OTHER PUBLICATIONS

Wikipedia "Gibberellin," last edited Dec. 2, 2019; https://en.wikipedia.org/wiki/Gibberellin.*
Wikipedia "Glycerol monostearate," last edited Sep. 21, 2019; https://en.wikipedia.org/wiki/Glycerol_monostearate.*
International Search Report of PCT/IB2019/051103, dated Apr. 23, 2019.
Notice of Transmittal of the International Search Report of PCT/IB2019/051103, dated Apr. 23, 2019.
Written Opinion of the International Searching Authority of PCT/IB2019/051103, dated Apr. 23, 2019.

* cited by examiner

*Primary Examiner* — Ileana Popa
*Assistant Examiner* — Alissa Prosser
(74) *Attorney, Agent, or Firm* — Collard & Roe, P.C.

(57) ABSTRACT

The present disclosure relates to an additive for soil conditioning and an agricultural composition comprising additive and plant growth regulator. The additive comprises a mixture of esters of fatty acids and an emulsifying agent. The additive of the present disclosure can be used in the conditioning of the soil which results in improvement in plant growth. The agricultural composition of the present disclosure can be used for improving soil condition and promoting plant growth.

6 Claims, 2 Drawing Sheets

ADDITIVE FOR SOIL CONDITIONING AND AN AGRICULTURAL COMPOSITION CONTAINING SAID ADDITIVE FOR PLANT GROWTH

CROSS REFERENCE TO RELATED APPLICATIONS

This application is a continuation of PCT/IB2019/051103 filed on Feb. 12, 2019, which claims priority under 35 U.S.C. § 119 of Indian Application No. 201821007239 filed on Feb. 26, 2018 and Indian Application No. 201821048783 filed on Dec. 22, 2018, the disclosures of which are incorporated by reference. The international application under PCT article 21(2) was not published in English.

FIELD

The present disclosure relates to an additive, a process for its preparation and an agricultural composition containing said additive.

Definition

As used in the present disclosure, the following term is generally intended to have the meaning as set forth below, except to the extent that the context in which it is used indicates otherwise.

Plant Growth Regulator: The term "Plant growth regulator" refers to any material of natural or synthetic origin that is applied to soils or to plant tissues to supply one or more plant nutrients essential to the growth of plants.

Market Fertilizer: The term "market fertilizer" refers to any material which is generally used as a fertilizer, such as Nitrogen, Phosphorous, and Potash/Potassium (NPK) mixture of 12:32:16, 19:19:19, DAP (Diammonium phosphate) and MOP (Muriate of potash)

Additive: An additive is a mixture of substances or a blend which can be added directly to soil to improve soil characteristics or can be added to an agricultural or fertilizer composition, which in turn is added to a soil to assist in growth and maintenance of plants.

Organic Carbon Deficient Soil: If the amount of organic carbon in a soil is less than 1% the soil is termed as organic carbon deficient soil.

BACKGROUND

The background information herein below relates to the present disclosure but is not necessarily prior art.

Plant growth and crop productivity is dependent mainly on the physical conditions of soil. Characteristics of good soil are high water holding capacity, adequate minerals such as boron, chlorine, cobalt, copper, iron, manganese, magnesium, molybdenum, sulphur and zinc for promoting plant growth and it (the soil) being well-drained. The soil characteristics can be improved through the use of good management practices. The soil characteristics can also be improved using microorganisms containing the potential to decompose soil organic matter, which in turn promotes plant growth by producing metabolites, increasing water retention capacity of the soil and also improving the physical condition of the soil. The improvement in soil texture and thereby the overall soil physical property is termed as soil conditioning.

The organic contents of soils are reduced due to the extensive use of chemical fertilizers and repeated farming which leads to hardening of the soil. Further, soil particles become compact and are not able to retain nutrients and moisture due to repeated and overuse of chemical fertilizers. Due to this, higher amounts of chemical fertilizer are required to supplement mineral ions and macro nutrients which are gradually lost from the soil. Extensive use of chemical fertilizers is a major cause of imbalance in the micro and macro nutrients in the soil and has deteriorated soil health, which ultimately results in low productivity and stagnancy in agriculture growth. For optimum plant growth, nutrients must be available in sufficient and balanced quantities. Excessive and exclusive dependence on nitrogenous and phosphate fertilizers can be very harmful to the soil. As a result, overall agricultural productivity gradually declines.

The constant assault on land (soil) by agricultural and horticultural chemicals cause imbalance in the amount of essential nutrients in the soil. Thus, the soil is rendered unsuitable for sustained farming and at times the soil denatures to such an extent that normal levels of plant life cannot be supported.

A number of soil conditioners for improving soil physical properties are available commercially in the market. However, these soil conditioners have limited activity and are not effective on all types of soil and/or crops/plants.

Therefore, there is felt a need for an additive (soil conditioning agent) that mitigates the aforestated drawbacks.

Further, there is felt a need for an agricultural composition that mitigates the aforementioned drawbacks.

Objects

Some of the objects of the present disclosure, which at least one embodiment herein satisfies, are as follows:

It is an object of the present disclosure to ameliorate one or more problems of the prior art or to at least provide a useful alternative.

An object of the present disclosure is to provide an additive capable of improving soil condition and in turn promote plant growth.

Another object of the present disclosure is to provide a process for preparing an additive capable of improving soil condition and in turn promote plant growth.

Still another object of the present disclosure is to provide an agricultural composition comprising an additive for soil conditioning and plant growth regulator for promoting plant growth.

Yet another object of the present disclosure is to provide a kit-of-parts which can comprise an additive, a plant growth regulator and a fertilizer.

Yet another object of the present disclosure is to provide a method for soil conditioning and thereby promoting plant growth.

Yet another object of the present disclosure is to provide use of an additive for improving soil condition and in turn promote plant growth and for treatment of soil.

Other objects and advantages of the present disclosure will be more apparent from the following description, which is not intended to limit the scope of present disclosure.

SUMMARY

In accordance with the present disclosure, there is provided an additive for improving soil condition, the additive comprising:

a. a mixture of esters of fatty acids in the range of 5 wt % to 95 wt % of the total weight of the additive, and b. an emulsifying agent in the range of 3 wt % to 25 wt % of the total weight of the additive.

Typically, the esters of fatty acids are selected from the group consisting of poly(ethylene glycol) 6000 distearate, poly(ethylene glycol) 20000 distearate, poly(ethylene glycol) 6000 dioleate, glycerol monostearate, sorbitan tri stearate, PEG-150 pentaerythrityl tetrastearate, sucrose tetra stearate and sucrose tetra palmitate.

Typically, the emulsifying agent is at least one selected from the group consisting of tridecyl alcohol and polyoxyethylene 10 tridecyl ether.

Typically, the additive is in the form selected from granules, powder, cake, gel, liquid, pellets, extrudates, beads, and flakes.

Typically, the additive comprises PEG 6000 distearate in an amount of 70 wt %, glycerol monostearate in an amount of 25 wt % and polyoxyethylene 10 tridecylether in an amount of 5 wt % of the total weight of the additive, for conditioning saline soil.

Typically, the additive comprises PEG 6000 distearate in an amount of 65 wt %, glycerol monostearate in an amount of 10 wt % and polyoxyethylene 10 tridecylether in an amount of 25 wt % of the total weight of the additive, for conditioning clayey soil.

Typically, the additive comprises PEG 6000 distearate in an amount of 45 wt %, glycerol monostearate in an amount of 20 wt %, PEG-150 pentaerythrityl tetrastearate in an amount of 25 wt % and polyoxyethylene 10 tridecylether in an amount of 10 wt % of total weight of additive, for conditioning sandy clay loam soil.

Typically, the additive comprises PEG 6000 distearate in an amount of 45 wt %, glycerol monostearate in an amount of 45 wt % and polyoxyethylene 10 tridecylether in an amount of 10 wt % of total weight of additive, for conditioning sandy clay loam soil.

Typically, the additive comprises PEG 6000 distearate in an amount of 85 wt %, glycerol monostearate in an amount of 10 wt % and polyoxyethylene 10 tridecylether in an amount of 5 wt % of total weight of additive, for conditioning medium black soil.

Typically, the additive comprises PEG 6000 distearate in an amount of 5 wt %, glycerol monostearate in an amount of 80 wt % and polyoxyethylene 10 tridecylether in an amount of 25 wt % of total weight of additive, for conditioning hard soil.

In accordance with another aspect of the present disclosure there is provided a process for preparation of the additive; the process comprising the following steps:
a. heating a mixture of esters of fatty acids to a temperature in the range of 30° C. to 90° C. under stirring to liquefy the mixture;
b. mixing an emulsifying agent in the liquefied mixture under stirring to obtain a resultant mixture;
c. cooling the resultant mixture to a temperature in the range of 15° C. to 40° C. to obtain a cooled mixture.
d. drying the cooled mixture to obtain the additive.

In accordance with yet another aspect of the present disclosure there is provided an agricultural composition for improving soil condition and promoting plant growth; the agricultural composition comprising:
a. an additive (comprising a mixture of esters of fatty acids in the range of 5 wt % to 95 wt % of the total weight of the additive and an emulsifying agent in the range of 3 wt % to 25 wt % of the total weight of the additive) in an amount in the range of 40 wt % to 90 wt % of the total weight of the agricultural composition;
b. a plant growth regulator in an amount in the range of 10 wt % to 60 wt % of the total weight of the agricultural composition.

Typically, the plant growth regulator comprises a nitrogen source, a potassium source and a phosphorous source.

Typically, a plant growth regulator comprises amides of fatty acids, tallow amine, ethylene bis strearamide, humate, brown sea weed, jagerry, corn flour, fulvic acid, grey seaweed, Gibberellic acid, brassinolide, diethyl aminethyl hexanoate (6DA) and amino powder.

In accordance with yet another aspect of the present disclosure there is provided a kit-of-parts for promoting plant growth and improving soil condition, the kit-of-parts comprising:
a. an additive (A), comprising:
   i. a mixture of esters of fatty acids in the range of 5 wt % to 95 wt % of the total weight of the additive; and
   ii. an emulsifying agent in the range of 3 wt % to 25 wt % of the total weight of the additive;
b. a plant growth regulator (B), comprising at least one of;
   i. amides of fatty acids;
   ii. tallow amine;
   iii. ethylene bis stearamide;
   iv. humate;
   v. brown sea weed;
   vi. jagerry;
   vii. corn flour;
   viii. fulvic acid;
   ix. grey seaweed;
   x. gibberellic acid;
   xi. brassinolide;
   xii. diethyl aminethyl hexanoate (6 DA); and
   xiii. amino powder; and
c. a fertilizer.

In accordance with yet another aspect of the present disclosure there is provided a method of improving soil condition; said method comprising; adding an effective amount to a soil or a portion thereof, or a locus thereof of an additive comprising a mixture of esters of fatty acids in an amount in the range of 5 wt % to 85 wt % of the total weight of the additive; an emulsifying agent in an amount in the range of 3 wt % to 25 wt % of the total weight of the additive.

Typically, the effective amount of the additive is in the range of 500 gram/acre to 700 gram/acre.

In accordance with yet another aspect of the present disclosure there is provided a use of an additive for improving soil condition comprising a mixture of esters of fatty acids, an emulsifying agent for treatment of soil.

In accordance with yet another aspect of the present disclosure there is provided a use of an agricultural composition for improving soil condition and promoting plant growth, comprising an additive (comprising a mixture of esters of fatty acids in the range of 5 wt % to 95 wt % of the total weight of the additive and an emulsifying agent in the range of 3 wt % to 25 wt % of the total weight of the additive) and a plant growth regulator for treatment of plants, its habitat, a crop or a crop field.

BRIEF DESCRIPTION OF THE ACCOMPANYING DRAWING

The present disclosure will now be described with the help of the accompanying drawing, in which:

FIGS. 1A and 1B illustrate the comparison of plant growth in the presence and absence of the additive of the present disclosure; and FIG. 2 illustrates the comparison of the root growth of plants grown in the presence and absence of the additive of the present disclosure when used with water having different hardness.

DETAILED DESCRIPTION

Embodiments, of the present disclosure, will now be described with reference to the accompanying drawing.

Embodiments are provided so as to thoroughly and fully convey the scope of the present disclosure to the person skilled in the art. Numerous details are set forth, relating to specific components, and methods, to provide a complete understanding of embodiments of the present disclosure. It will be apparent to the person skilled in the art that the details provided in the embodiments should not be construed to limit the scope of the present disclosure. In some embodiments, well-known processes, well-known apparatus structures, and well-known techniques are not described in detail.

The terminology used, in the present disclosure, is only for the purpose of explaining a particular embodiment and such terminology shall not be considered to limit the scope of the present disclosure. As used in the present disclosure, the forms "a," "an," and "the" may be intended to include the plural forms as well, unless the context clearly suggests otherwise. The terms "comprises," "comprising," "including," and "having," are open ended transitional phrases and therefore specify the presence of stated features, integers, steps, operations, elements, modules, units and/or components, but do not forbid the presence or addition of one or more other features, integers, steps, operations, elements, components, and/or groups thereof. The particular order of steps disclosed in the method and process of the present disclosure is not to be construed as necessarily requiring their performance as described or illustrated. It is also to be understood that additional or alternative steps may be employed.

As used herein, the term "and/or" includes any and all combinations of one or more of the associated listed elements.

The terms first, second, third, etc., should not be construed to limit the scope of the present disclosure as the aforementioned terms may be only used to distinguish one element, component, region, layer or section from another component, region, layer or section. Terms such as first, second, third etc., when used herein do not imply a specific sequence or order unless clearly suggested by the present disclosure.

Though the use of chemical fertilizers and insecticides has increased agricultural productivity for a while, there has been a stagnation due to the use of extensive chemical fertilizers, which deteriorates soil health resulting in low productivity of agriculture produce. To improve agricultural productivity, farmers use chemicals to fertilize plants and to fight pests and diseases. However, most of these chemicals destroy beneficial soil microorganisms and damage a plant's natural ability to fend off pests and diseases. Further, chemical fertilizers can build up in the soil and eventually reduce the overall productivity of the soil, and the plants become weaker and weaker in the process.

Plant productivity, crop yield and soil health are directly related to each other. An organic carbon deficient soil cannot produce better crop and plant, and is considered as less fertile. Soil fertility can be enhanced/improved by improving the soil physical, chemical and biological properties.

Therefore, there is a need for an environmentally friendly additive capable of improving soil condition and soil property of compact or rigid soil by providing loosening effect on soil resulting in soil becoming less rigid and less compact to facilitate favorable soil conditions for plants which allow roots to penetrate the soil more efficiently.

In an another aspect there is need for an environmentally friendly additive capable of improving soil condition and soil property of loose and less compact soil such as sand resulting in soil becoming more compact and rigid to facilitate favorable soil conditions for plants such as improved water and minerals retention.

Therefore, the present disclosure envisages an additive for improving soil condition which in turn promotes plant growth and that mitigates the aforestated drawbacks.

The additive of the present disclosure will aid farmers by reducing dependency on chemical fertilizers which are comparatively costly and harmful to the soil health. In addition, the additive is capable of rejuvenating soil for sustainable production without incremental cost and also reduced water requirement for irrigation.

In one embodiment, the additive is capable of loosening the soil, which allows the roots to penetrate the soil more efficiently. The additive of the present disclosure is capable of imparting these benefits to the soil without any hazardous side effects to human and environment.

In another embodiment, the additive is capable of producing tightening or compacting effect on soil, which allows loose and less compact soil such as sand resulting in more compact and rigid soil to facilitate favorable soil conditions for plants such as improved water and minerals retention as well as holding of roots of plant firmly. The additive of the present disclosure is capable of imparting these benefits to the plants and/or soil without any hazardous side effects to human and environment.

The additive of the present disclosure comprises a mixture of esters of fatty acids and an emulsifying agent.

The mixture of esters of fatty acids is present in an amount in the range of 5 wt % to 95 wt % of the total weight of the additive.

Typically, the esters can be selected from the group that includes, but is not limited to, poly(ethylene glycol) 6000 distearate, poly(ethylene glycol) 20000 distearate, poly(ethylene glycol) 6000 dioleate, glycerol monostearate, sorbitan tri stearate, PEG-150 pentaerythrityl tetrastearate, sucrose tetra stearate and sucrose tetra palmitate.

In an embodiment of the present disclosure, the mixture of esters of fatty acids is a mixture of polyethylene glycol 6000 distearate and glycerol monostearate. The mixture of esters of fatty acids holds/binds the soil together and acts as a medium for the growth of bacteria, such as nitrogen fixing bacteria. As a result, the count of the beneficial bacteria increases in the soil naturally. Further, the mixture of esters of fatty acids aids in soil dispersion and enhances the water absorption capacity of the soil particles.

In an embodiment of the present disclosure, the mixture of esters of fatty acids is a mixture of polyethylene glycol 150 pentaerythrityl tetrastearate and glycerol monostearate.

In an embodiment of the present disclosure, the mixture of esters of fatty acids is a mixture of polyethylene glycol 6000 distearate, glycerol monostearate and sorbitan tetra stearate.

In an embodiment of the present disclosure, the mixture of esters of fatty acids is a mixture of polyethylene glycol 6000 distearate, glycerol monostearate and sucrose tetra stearate.

In an embodiment of the present disclosure, the mixture of fatty acids is a mixture of polyethylene glycol 6000 distearate and Glycerol monostearate.

The emulsifying agent is present in an amount in the range of 3 wt % to 25 wt % of the total weight of the additive. The emulsifying agent can be selected from an alcohol, ether, and a mixture of an alcohol and ether. In an embodiment, the emulsifying agent is tridecyl alcohol. In another embodiment, the emulsifying agent is polyoxyethylene 10 tridecyl ether. In still another embodiment, the emulsifying agent is a mixture of tridecyl alcohol and polyoxyethylene 10 tridecyl ether. The emulsifying agent reduces the surface tension of the soil particles and increases its capillary action.

In another embodiment of the present disclosure, the additive for improving soil condition comprises a mixture of poly ethylene glycol 6000 distearate and glycerol mono stearate in an amount in the range of 65 wt % to 85 wt % of the total weight of the additive, polyoxyethylene 10 tridecyl ether in an amount in the range of 10 wt % to 25 wt % of the total weight of the additive.

Typically, the additive can be in a form selected from the group consisting of granules, powder, cake, gel, liquid, pellets, extrudates, beads, and flakes. In an embodiment, the additive of the present disclosure is in the form of a cake.

The selection of an additive comprising a mixture of esters of fatty acids, an emulsifying agent and a plant growth regulator, and proportions of different components in the additive is dependent on the type of soil, physical and chemical properties of soil and crops to be harvested. The effects of different components in additive on soil and plants are as follows.

Polyethylene Glycol Esters (PEG)—

PEG 6000 distearate, PEG 150 distearate, PEG 6000 Pentaerithrytile Tetrastearate acts as binding agent, humectant, spreading agent, wetting agent and dispersing agent. It is essential for soil wetting. All PEG compounds possess excellent water solubility at a room temperature. Further, solubility and viscosity of the solutions of PEG is not affected by presence of other electrolytes. They are quite soluble in hard water or any other aqueous solutions of various salts. The additives containing PEG are suitable for different types of soils such as saline soil, clayey soils, sandy clay loam soil, medium black soil and hard soil etc. PEG makes soil and root membranes more permeable to nutrients thereby allowing more nutrients to be absorbed by the roots. PEG is also essential for biosynthesis of nucleic acid, floral induction, fruit thinning, hormone interaction and photoperiodicity.

Glycerol Monostearate—

Glycerol monostearate acts as a softening agent, penetrating agent and clump preventer. Glycerol monostearate shown to exert excellent growth benefits in soil by making soil and root membranes more permeable to nutrients thereby allowing more nutrients to be absorbed by the roots. Further, glycerol monostearate acts as humectants to retain moisture and increase water holding capacity of the soil. It also resists moisture freezing in cold season. It helps to reduce crusting, loosening of clay soils, aggregates sandy soil, and allows water and oxygen to better reach plant roots by reducing the surface tension between the water and the soil. Glycerol monostearate causes soil to clump and form soil aggregates, thereby improving soil structure. It improves soil structure causing improvement in permeability (infiltration of water through the soil), which results in an increase in the soil's ability to take up and hold water.

Polyoxyethylene 10 Tridecyl Ether/Polyoxyethylene 5 Tridecyl Alcohol—

Polyoxyethylene 10 tridecyl ether/Polyoxyethylene 5 tridecyl alcohol acts as emulsifying and spreading agent.

Fulvic Acid—

Fulvic acid along with additive acts as a transporter and detoxification agent. Fulvic acid enhances and increases the absorption of other compounds such as nutrients, tinctures, minerals and foods with which it is combined. Fulvic acid transports nutrients into the cells and acts as a catalyst for utilizing nutrients in the cell.

Brown Seaweed and Gray Seaweed—

They act as bio-stimulants and soil conditioner.

Gibberellic Acid, Brassinolide and Diethyl Aminoethyl Hexanoate (6DA)—

They act as plant hormones.

Humic Acid—

Humic acid acts as a chelating agent or sequestering agent.

The quantity of ester of fatty acid in an additive can be based on the type of soil. Following examples illustrates that by varying the proportions of different components in additives can result in desired effects in different types of soils.

Typically, the additive comprising PEG 6000 distearate in an amount of 70 wt %, glycerol monostearate in an amount of 25 wt % and polyoxyethylene 10 tridecylether in an amount of 5 wt % of the total weight of the additive, for conditioning saline soil. The application of this additive to saline soil accelerates sodium leaching, increases soils total organic carbon (TOC) content and water-stable aggregates. The additive decreases the exchangeable sodium percentage (ESP), soil electrical conductivity (EC), and soil salinity.

Typically, the additive comprising PEG 6000 distearate in an amount of 65 wt %, glycerol monostearate in an amount of 10 wt % and polyoxyethylene 10 tridecylether in an amount of 25 wt % of the total weight of the additive, for conditioning clayey soil. The application of this additive to clayey soil improves soil cation exchange capacity (CEC), permeability, increases soil total organic carbon (TOC) content and decreases soil pH. The additive also provides suitable medium for plant growth.

Typically, the additive comprising PEG 6000 distearate in an amount of 45 wt %, glycerol monostearate in an amount of 20 wt %, PEG-150 pentaerythrityl tetrastearate in an amount of 25 wt % and polyoxyethylene 10 tridecylether in an amount of 10 wt % of total weight of additive, for conditioning sandy clay loam soil. The application of this additive to sandy soils prevents soil erosion, abiotic stress and increases soil total organic carbon (TOC) and microbial biomass in soil resulting in more fertile soil for plant growth.

Typically, the additive comprising PEG 6000 distearate in an amount of 45 wt %, glycerol monostearate in an amount of 45 wt % and polyoxyethylene 10 tridecylether in an amount of 10 wt % of total weight of additive, for conditioning sandy clay loam soil. The application of this additive to sandy clay loam soil prevents leaching essential nutrient with water and increases soil total organic soil (TOC) and bulk density of soil.

Typically, the additive comprising PEG 6000 distearate in an amount of 85 wt %, glycerol monostearate in an amount of 10 wt % and polyoxyethylene 10 tridecylether in an amount of 5 wt % of total weight of additive, for conditioning medium black soil. The application of this additive to medium black soil increases soil porosity, soil total organic carbon (TOC), soil cation exchange capacity (CEC) and decreases soil bulk density.

Typically, the additive comprising PEG 6000 distearate in an amount of 5 wt %, glycerol monostearate in an amount of 80 wt % and polyoxyethylene 10 tridecylether in an amount of 15 wt % of total weight of additive, for conditioning hard soil. The application of this additive to hard soil increases soil porosity in a very short duration of time leading to increase in the rate of respiratory activity of its roots so that the transpiration rate increases and consequently the photosynthesis rate increases. Further, this additive increases biological availability of phosphate as phosphorus is essential for the development of cells, cell division & the structure of DNA in the plant.

The present disclosure in another aspect provides a process for preparing an additive for promoting plant growth and improving soil condition. The process comprises the following steps:

Initially, a mixture of esters of fatty acids is heated to a temperature in the range of 30° C. to 90° C. under stirring to liquefy the mixture of esters of fatty acids. The mixture of fatty acids is present in an amount in the range of 5 wt % to 95 wt % of the total weight of the additive. Typically, the mixture of esters is mixtures of stearates. In an embodiment of the present disclosure, the mixture of esters is a mixture of poly ethylene glycol 6000 distearate and glycerol monostearate, PEG 150 pentaerythrityl tetrastearate and glycerol monostearate, PEG 150 pentaerythrityl tetrastearate, PEG 6000 distearate and glycerol monostearate. The heating is carried out in such a way that the mixture of esters is in a viscous form, without allowing it to degrade.

An emulsifying agent is added to the homogenous mixture under stirring to obtain a resultant mixture. The emulsifying agent is present in an amount in the range of 3 wt % to 25 wt % of the total weight of the additive. The emulsifying agent can be selected from an alcohol, ether, and a mixture of an alcohol and ether. In an embodiment, the emulsifying agent is tridecyl alcohol. In another embodiment, the emulsifying agent is polyoxyethylene 10 tridecyl ether. In still another embodiment, the emulsifying agent is a mixture of tridecyl alcohol and polyoxyethylene 10 tridecyl ether.

The resultant mixture is then cooled to a temperature in the range of 15° C. to 40° C. to obtain the additive.

The additive of the present disclosure can be easily added to the soil. In an embodiment of the present disclosure, the additive is prepared in the form of cake and is first dissolved with warm water at a pre-determined ratio and the resultant slurry/dispersion is then applied on the soil by drop method or spray method. The slurry/dispersion can also be applied in the furrows of the tilled field.

In one embodiment, the slurry/dispersion of additive is applied to the seeds, by soaking the seeds with or without pressure in a machine at 60° C. or essential temperature, followed by drying and then planting/sowing the treated/coated seeds.

Typically, the warm water has a temperature above 60° C.

The pre-determined ratio of the additive to water can be in the range of 1:20 to 1:30. In one embodiment of the present disclosure, the ratio of the additive to water is 1:25 (600 g of additive to 15 liters of water).

Typically, the additive of the present disclosure is administered in an amount in the range of 500 g/acre to about 700 g/acre. In an embodiment, the additive of the present disclosure is administered in an amount of 600 g/acre. Since, the additive of the present disclosure is used in such low quantities; it can be easily transported at reduced cost, making it commercially feasible.

Typically, the additive comprises a mixture of esters of fatty acids, and the emulsifying agent having purity more than 98% and moisture content less than 0.05%.

The present disclosure in still another embodiment provides a method of promoting improving soil condition and which in turn improve plant growth. The method comprises adding an effective amount of an additive to a soil or a portion thereof, or a locus thereof. The additive comprises a mixture of esters of fatty acids in an amount in the range of 5 wt % to 85 wt % of the total weight of the additive; an emulsifying agent in an amount in the range of 3 wt % to 25 wt % of the total weight of the additive.

Typically, the effective amount of the additive can be in the range of 500 g/acre to 700 g/acre. In an embodiment, the effective amount of the additive is 600 g/acre. The optimum amount of the additive is decided based on the soil conditions, such as pH of soil, moisture content, amount of macro and micronutrients.

In an embodiment the additive can be added to the soil with a fertilizer.

The fertilizer comprises a nitrogen source, a potassium source and a phosphorous source.

In an embodiment fertilizer can comprise Nitrogen, Phosphorous, and Potash/Potassium (NPK) mixture of 12:32:16, 19:19:19, DAP (Diammonium phosphate) and MOP (Muriate of potash) (NPK) in the ratio of 12:32:16

In another embodiment, the additive for improving soil condition is added to the soil without the fertilizers.

The present disclosure in yet another aspect provides use of an additive for soil conditioning which in turn promotes plant growth. The additive comprises a mixture of fatty acid esters, an emulsifying agent.

Typically, the additive for improving soil condition which in turn improves plant growth is capable of improving the plant/crop yield typically even by 60%.

The additive of the present disclosure can be applied to any type of soil including black cotton soil, saline soil, medium to high saline soil, yellow soil, sandy soil, loamy soil, alluvial soil (delta soil), lava soil, top soil and subsoil that can be used in crop/plant production.

The additive provides higher air permeability to the soil and improves the immunity of the plants, increases the photosynthesis rate, provides energy to the plant for its respiration and reduces abiotic stress, increases nutrients in fruits, cereals, pulses and vegetables due to the improvement in soil condition, stimulates crop growth and gives a uniformly higher yield. The additive of the present disclosure is non-ionic in nature, and therefore promotes the ion exchange process of the plant and the soil too. The additive when used in seed coating is capable of improving seeds germination.

The additive of the present disclosure improves the plant yield up to 60%, depending on the type of crop, type of soil and availability of type of water such as soft water/hard water, temperature and the like. The additive of the present disclosure also improves the nutrient contents of edible content of plants/crops.

The additive enhances the conditioning of the soil and increases the soil water absorption and water retention ability, ultimately increasing the porosity and permeability of the soil.

The additive of the present disclosure is suitable for use as a soil conditioner. The soil conditioner in the additive enables soil conditioning which increases organic carbon content of the soil and develops immunity in plants to fend off pest and disease. Moreover, the additive is also capable of reducing the harmful effect of chemicals accumulated in soil after prolonged exposure to chemical fertilizers, thereby improving the physico-chemical properties of the soil. The additive can be used as a sustainable agrochemical composition by reducing the health hazardous caused by the extensive use of chemical fertilizers/pesticides.

In yet another aspect, there is a need for environmentally friendly agricultural compositions capable of improving soil condition as well as which is capable of providing a natural source of NPK and other essential minerals and trace elements. It is desirable to create more favorable media for plant growth and to conserve soil by improving soil organic carbon, soil pH, soil porosity, water-holding capacity, water infiltration rates, aeration and temperature that is environmentally acceptable.

Therefore, present disclosure envisages an agricultural composition comprising an additive (A) for improving soil condition and plant growth regulator (B).

The agricultural composition comprising additive (A) in an amount in the range of 40 wt % to 90 wt % of the total weight of the agricultural composition and plant growth regulator (B) is present in an amount in the range of 10 wt % to 60 wt % of the total weight of the agricultural composition.

The plant growth regulator (B) can be selected from the group consisting of amides of fatty acids, tallow amine, ethylene bis stearamide, humate, brown seaweed, jagerry, corn flour, fulvic acid, grey seaweed, gibberellic acid, brassinolide, diethyl aminoethyl hexanoate (6 DA) and amino powder.

In an embodiment the plant growth regulator (B) comprise humate—25 wt %, brown seaweed—7.5 wt %, fulvic acid—15 wt %, grey seaweed—7.5 wt %, gibberellic acid—1 wt %, brassinolide—2.5 wt %, diethyl aminoethyl hexanoate (6DA)—2.5 wt % and amino powder—39 wt % of the total weight of plant growth regulator (B).

In an another embodiment the plant growth regulator (B) comprises humate 25 wt %, brown sea weed 15 wt %, jagerry 30 wt % and corn flour 30 wt %.

In an another embodiment the plant growth regulator (B) comprises Fulvic acid 5 wt %, Brown seaweed—2.5 wt %, Grey seaweed-2.5 wt %, Gibberellic acid-0.35 wt %, Brassinolide-0.87 wt %, Diethyl aminoethyl hexanoate-0.87 wt %, Amino powder-14 wt %, Humate-8.7 wt %.

In an embodiment of the present disclosure, the additive can be mixed with plant growth regulator amides to form a mixture.

Typically, amides can be selected from tallow amine, amino powder, ethylene bis stearamide and carbamide.

In an embodiment of the present disclosure, the mixture of additive and amides, where the additive is 75 wt % and tallow amine is 25 wt % of the total weight of the mixture of additive and amides.

The agricultural composition of the present disclosure can be applied to crops including fruits, nuts, citrus, watermelons, tomatoes, peppers, cucumbers, row crops such as cotton, corn and wheat, as well as other edible, commercial, perennial, horticulture and ornamental crops.

The agricultural composition of the present disclosure is effective in improving the growth of plants, is stable, is required in small quantity and aids in the uptake of the macronutrients/micronutrients in the soil such as potassium, magnesium, sodium, selenium, and phosphorus.

The agricultural composition of the present disclosure is rich in nutrients necessary for basic plant nourishment. This includes nitrogen, phosphorus and potassium. It is also rich in TOC (Total organic carbon) necessary for the decomposition of SOM (Soil organic matter). Soil organic carbon (SOC) is the basis of soil fertility. It releases nutrients for plant growth, promotes the structure, biological and physical health of soil, and acts as a buffer against harmful substances. Organic matter is manufactured by plants using carbon dioxide from the air and water. SOC is a strong determinant of soil quality and crop productivity, higher soil organic matter levels cause greater soil nitrogen retention, greater microbial biodiversity, and promote the presence and growth of arbuscular mycorrhizal fungi that penetrate the roots of crops and facilitate the movement of plant nutrients from the soil into the crop plants resulting in better crop growth and yields.

The soil organic matter improves aggregation of soil particles resulting in a better soil structure, allowing for movement of air and water through the soil as well as better root growth. This result in less soil erosion, and retains nutrients on the land and protection of water quality.

The soil organic carbon increases the cation exchange capacity of the soil, and enhances chelation of metals, which are important for retention of nutrients, and increasing bioavailability of trace elements, respectively. The soil organic carbon also provides sites for anthropogenic chemicals, thereby reducing the leaching of hazardous chemicals.

Further, soil organic carbon provides carbon and energy for soil microorganisms and fauna.

Therefore, the total organic carbon in soil may decrease atmospheric carbon dioxide and increase soil quality.

The present disclosure in another aspect provides a kit-of-parts for promoting plant growth, and improving soil condition. The kit-of-parts comprises an additive (A) in the range of 25 wt % to 40 wt %, plant growth regulator (B) in the range of 35 wt % to 45 wt %, and a fertilizer (C) in the range of 25 wt % to 30 wt % of the total weight of the kit-of-parts.

In an embodiment, the additive (A) can be added to the soil separately without adding plant growth regulator (B).

In an embodiment, the additive (A) for improving soil condition is added with the plant growth regulator (B) as an agricultural composition (AB).

In another embodiment, the additive (A) for improving soil condition is added with the fertilizer (C).

In yet another embodiment, the additive (A) for improving soil condition is added with the plant growth regulator (B) and fertilizer (C).

The foregoing description of the embodiments has been provided for purposes of illustration and not intended to limit the scope of the present disclosure. Individual components of a particular embodiment are generally not limited to that particular embodiment, but, are interchangeable. Such variations are not to be regarded as a departure from the present disclosure, and all such modifications are considered to be within the scope of the present disclosure.

The present disclosure is further described in light of the following experiments which are set forth for illustration purpose only and not to be construed for limiting the scope of the disclosure. The following experiments can be scaled up to industrial/commercial scale and the results obtained can be extrapolated to industrial scale.

EXPERIMENTAL DETAIL

Experiment-1: Preparation of the Additive (in the Form of Cake) in Accordance with the Present Disclosure Additive of the present disclosure was prepared using the following ingredients as given in Table-1.

General Procedure for Preparing an Additive

A pre-determined amount of polyethylene glycol 6000 distearate was heated to 60° C. in a vessel equipped with a mechanical stirrer to obtain liquefied polyethylene glycol 6000 distearate. Glycerol monostearate (SE Grade) was blended in to the liquefied poly ethylene glycol 6000 distearate under stirring to obtain a homogeneous mixture. An emulsifying agent (tridecyl alcohol and/or polyoxyethylene 10 tridecyl ether) was added to the homogeneous mixture to obtain a resultant mixture. The additional component was added to the resultant mixture, if used in the resultant mixture, followed by cooling to obtain the additive.

General Procedure for Preparing a Mixture of Additive and Polyamide

A pre-determined amount of polyethylene glycol 6000 distearate was heated to 60° C. in a vessel equipped with a mechanical stirrer to obtain liquefied polyethylene glycol 6000 distearate. Glycerol monostearate (SE Grade) was blended in to the liquefied polyethylene glycol 6000 distearate under stirring to obtain a homogeneous mixture. An emulsifying agent (tridecyl alcohol and/or polyoxyethylene 10 tridecyl ether) was added to the homogeneous mixture to obtain a resultant mixture. The polyamide component was added to the resultant mixture of additive to obtain the mixture of additive and polyamide.

General Procedure for Preparing an Agricultural Composition

A predetermined amount of additive (A) was mixed with plant growth regulator (B) to obtain an agricultural composition (AB).

TABLE 1

Ingredients of the additive (in the form of cake)

| Ingredients used | Additive 1 (wt %) | Additive 2 (wt %) | Additive 3 (wt %) | Additive 4 (wt %) | Additive 5 (wt %) | Additive 6 (wt %) | Additive 7 (wt %) | Additive 8 (wt %) | Additive 9 (wt %) | Additive 10 (wt %) | Additive 11 (wt %) | Additive 12 (wt %) | Additive 13 (wt %) | Additive 14 (wt %) |
|---|---|---|---|---|---|---|---|---|---|---|---|---|---|---|
| PEG 6000 Distearate (Ester of fatty acid) | 70 | 65 | 45 | — | 70 | 40 | 45 | 45 | 45 | 10 | 55 | 80 | 85 | 5 |
| Glycerol monostearate (SE self-emulsify grade) (Ester of fatty acid) | 25 | 10 | 45 | 65 | 10 | 10 | 10 | 10 | 20 | 75 | 20 | 15 | 10 | 80 |
| PEG-150 Pentaerythrityl Tetrastearate (Ester of fatty acid) | — | — | — | 30 | — | — | — | — | 25 | — | — | — | — | — |
| Sorbitan tristearate (Ester of fatty acid) | — | — | — | — | — | 30 | 25 | — | — | — | — | — | — | — |
| Sucrose tetrastearate (Ester of fatty acid) | — | — | — | — | — | — | — | 25 | — | — | — | — | — | — |
| Tridecyl alcohol (Emulsifying agent) | — | — | — | — | 10 | 20 | — | — | — | — | 10 | — | — | — |
| Polyoxyethylene 10 tridecylether (Emulsifying agent) | 5 | 25 | 10 | 5 | 10 | — | 20 | 20 | 10 | 15 | 15 | 5 | 5 | 15 |

TABLE 2

Agricultural compositions comprising additive and plant growth regulator

| Sr. No | Components | Agricultural Composition (AB)1 | Agricultural Composition (AB) 2 | Agricultural Composition (AB) 3 | Agricultural Composition (AB) 4 | Agricultural Composition (AB) 5 | Agricultural Composition (AB) 6 |
|---|---|---|---|---|---|---|---|
| 1 | Additive (A) | Additive (1) 40 wt % | Additive (11) 75 wt % | Additive (12) 60 wt % | Additive (2) 65 wt % | Additive (4) 70 wt % | Additive (7) 60 wt % |
| 2 | Plant Growth Regulator (B) | Plant Growth Regulator (60 wt %) Humate 15 wt % Brown seaweed 9 wt % Jagerry 18 wt % Corn Flour 18 wt % | Plant Growth Regulator (25 wt %) Tallow amine 25 wt % | Plant Growth Regulator (40 wt %) Humate 10 wt % Brown seaweed 6 wt % Jagerry 12 wt % Corn Flour 12 wt % | Plant Growth Regulator (35 wt %) Fulvic acid 5 wt % Brown seaweed 2.5 wt % Grey seaweed 2.5 wt % Gibberellic acid 0.40 wt % Brassinolide 0.87 wt % | Plant Growth Regulator (30 wt %) Humate 7.5 wt % Brown seaweed 4.5 wt % Jagerry 9 wt % Corn Flour 9 wt % | Plant Growth Regulator (40 wt %) Fulvic acid 6 wt % Brown seaweed 3 wt % Grey seaweed 3 wt % Gibberellic acid 0.4 wt % Brassinolide 1 wt % |

TABLE 2-continued

Agricultural compositions comprising additive and plant growth regulator

| Sr. No | Agricultural Composition Components | Agricultural Composition (AB)1 | Agricultural Composition (AB) 2 | Agricultural Composition (AB) 3 | Agricultural Composition (AB) 4 | Agricultural Composition (AB) 5 | Agricultural Composition (AB) 6 |
|---|---|---|---|---|---|---|---|
| | | | | | Diethyl aminoethyl hexanoate 0.87 wt % Amino powder 14 wt % Humate 8.86 wt % | | Diethyl aminoethyl hexanoate 1 wt % Amino powder 15.6 wt % Humate 10 wt % |

Experiment-2: Effect of the Additive Prepared in Accordance with the Present Disclosure on Soil and Various Crops Test-1: Effect of Additives Prepared in Accordance with the Present Disclosure on Soil Properties which was Used for Harvesting Okra (Observation Period: 4 Months)

The study was carried out at the Village of Pinsad in Naysari District (Gujarat). Okra hybrid variety was used for the study. The soil of the experimental field was clay loam soil and the chemical and physical pre-analysis showed in Table-3. A total of 9 treatments were subjected to randomize complete with two replications. The seed of hybrid okra were sown in a plot size of 6.0 m×5.0 m spaced with 60.0 cm×20.0 cm to keep 250 plants per plot for each treatment. Additives (component A), plant growth regulator (B) and agricultural compositions (AB) prepared in Experiment 1 were used for the studies.

TABLE 3

| Parameters | Unit | Result |
|---|---|---|
| pH | — | 8.65 |
| Electrical conductivity (EC) | dS/m | 0.245 |
| Total Organic Carbon (TOC) | % | 0.55 |
| Available N | Kg/ha | 225.00 |
| Available $P_2O_5$ | Kg/ha | 29.55 |
| Available $K_2O$ | Kg/ha | 435 |
| diethylenetriaminepentaacetic acid (DTPA) extractable Fe | mg/kg | 11.40 |
| diethylenetriaminepentaacetic acid (DTPA) extractable Mn | mg/kg | 20.77 |
| diethylenetriaminepentaacetic acid (DTPA) extractable Zn | mg/kg | 4.27 |
| diethylenetriaminepentaacetic acid (DTPA) extractable Cu | mg/kg | 14.90 |
| diethylenetriaminepentaacetic acid (DTPA) extractable B | mg/kg | 0.20 |
| Water Holding Capacity (WHC) | % | 70.65 |
| Porosity | % | 40.80 |

Dry Matter Yield of Plant and Fruit Yield of Okra

The dry matter yield of okra recorded after harvest of the crop and presented in Table-3a.

TABLE 3a

| Sample No. | Treatment details | DMY of Plant (kg/ha) | Fruit yield of okra (q/ha) |
|---|---|---|---|
| 1 | Additive 2 | 4720.37 | 81.00 |
| 2 | Control (Only water) | 4066.40 | 53.00 |
| 3 | Fertilizer (12:32:16) | 5058.18 | 61.00 |
| 4 | Additive 2 + Fertilizer (12:32:16) | 5205.10 | 88.00 |
| 5 | Plant growth regulator (PGR) | 4454.34 | 61.00 |
| 6 | Additive 2 + Plant growth regulator (PGR) | 5199.42 | 89.00 |
| 7 | Additive 2 + Plant growth regulator (PGR) + Fertilizer (12:32:16) | 5214.52 | 90.00 |

The result revealed that highest dry matter yield of plant (5214.52 kg/ha) and fruit yield of okra (90.00 q/ha) was recorded due to application of additive 2 along with fertilizer and plant growth regulator (PGR) of the present disclosure. However, lowest dry matter yield of plant and fruit yield of okra was found in control with a tune figure of 4066.40 kg/ha and 53.00 q/ha respectively.

Chemical Properties

The results pertaining to changes in chemical properties of soil viz., pH and Soil electrical conductivity (EC) measured in decisiemens per meter (dS/m) are presented in Table-3b.

TABLE 3b

| ID | Treatment details | pH | EC (dS/m) |
|---|---|---|---|
| 1 | Additive 4 | 8.46 | 0.236 |
| 2 | Control (Only water) | 8.71 | 0.326 |
| 3 | Fertilizer (12:32:16) | 8.71 | 0.312 |
| 4 | Additive 4 + Fertilizer (12:32:16) | 8.17 | 0.211 |
| 5 | Plant growth regulator (PGR) | 8.63 | 0.241 |
| 6 | Additive 4 + Plant growth regulator (PGR) | 8.11 | 0.207 |
| 7 | Additive 4 + Plant growth regulator (PGR) + Fertilizer (12:32:16) | 8.02 | 0.201 |

The results showed that chemical properties improved significantly with application of additive 4 along with fertilizer and plant growth regulator (PGR) as compared to fertilizer alone and control. The lowest pH and EC (dS/m) was observed with application of additive along with fertilizer and plant growth regulator (PGR) with a tune value of 8.02 and 0.201 over application of fertilizer (12:32:16) alone and rest of the treatments followed by Additive 4 with a tune value of 8.46 and 0.236, respectively.

Soil Fertility

As like chemical properties, soil fertility parameters viz., Total Organic Carbon (TOC) available N, $P_2O_5$, $K_2O$, Fe, Mn, Zn, Cu and B were also determined after harvest of okra and the results are submitted in Table-3c and Table-3d.

Primary Nutrient and TOC

TABLE 3c

| ID | Treatment details | TOC (%) | N (kg/ha) | P₂O₅ (kg/ha) | K₂O (kg/ha) |
|---|---|---|---|---|---|
| 1 | Additive 7 | 0.80 | 268 | 36.08 | 502 |
| 2 | Control (Only water) | 0.46 | 195 | 23.97 | 423 |
| 3 | Fertilizer (12:32:16) | 0.40 | 232 | 54.55 | 444 |
| 4 | Additive 7 + Fertilizer (12:32:16) | 0.70 | 271 | 68.21 | 537 |
| 5 | Plant growth regulator (PGR) | 0.46 | 211 | 33.31 | 465 |
| 6 | Additive 7 + Plant growth regulator (PGR) | 0.82 | 275 | 69.28 | 540 |
| 7 | Additive 7 + Plant growth regulator (PGR) + Fertilizer (12:32:16) | 0.85 | 276 | 70.10 | 542 |

The results presented in Table-3c revealed that higher Total Organic Carbon (0.85%) content in soil was recorded with application of additive 7 along with plant growth regulator (PGR) and fertilizer as compared rest of the treatments which was followed by application of additive along with fertilizer and application of additive only in case of Total Organic Carbon (0.82%) and Total Organic Carbon (0.80%) respectively.

The results presented in Table-3c revealed that higher N (276 kg ha⁻¹), P₂O₅ (70.10 kg ha⁻¹) and K₂O (542 kg ha⁻¹) content in soil were recorded due to application of additive along with fertilizer and plant growth regulator as compared to rest of the treatments which was followed by application of additive along with fertilizer in case of available N (275 kg ha⁻¹), P₂O₅ (69.28 kg ha-1) and K₂O (540 kg ha⁻¹), while with application of fertilizer only in case of P₂O₅ (54.55 kg ha⁻¹).

Micronutrient

TABLE 3d

| ID | Treatment details | Fe (mg/kg) | Mn (mg/kg) | Zn (mg/kg) | Cu (mg/kg) | B (mg/kg) |
|---|---|---|---|---|---|---|
| 1 | Additive 8 | 15.7 | 17.30 | 4.48 | 13.4 | 0.39 |
| 2 | Control (Only water) | 13.6 | 14.63 | 3.02 | 12.2 | 0.14 |
| 3 | Fertilizer (12:32:16) | 13.7 | 15.21 | 4.09 | 13.1 | 0.17 |
| 4 | Additive 8 + Fertilizer (12:32:16) | 15.6 | 17.88 | 4.53 | 13.6 | 0.29 |
| 5 | Plant growth regulator (PGR) | 13.9 | 16.50 | 4.05 | 13.2 | 0.18 |
| 6 | Additive 8 + Plant growth regulator (PGR) | 15.8 | 17.90 | 4.55 | 13.8 | 0.40 |
| 7 | Additive 8 + Plant growth regulator (PGR) + Fertilizer (12:32:16) | 15.9 | 17.98 | 4.59 | 13.9 | 0.42 |

An appraisal of the results presented in Table-3d revealed that available Fe and B status of the soil after harvesting of okra were higher due to use of additive 8 along with plant growth regulator and fertilizer over rest of the treatments with a tune value of 15.9 and 0.42 mg/kg. However, there was not much decrease in available Fe and B status of the soil with use of additive 8 along with fertilizer as compared to use of additive 8 along with plant growth regulator and fertilizer with a tune value of 15.6 and 0.29 mg/kg, respectively.

Further, it is seen from Table-3d that available Mn, Zn and Cu status of the soil after harvesting of okra were higher due to use of additive 8 along with plant growth regulator and fertilizer over rest of the treatments with a tune value of 17.98, 4.59 and 13.9 mg/kg. However, there was not much decrease in available Mn, Zn and Cu status of the soil with use of additive 8 along with the fertilizer over use of additive 8 with a tune figure of 17.30, 4.48 and 13.4 mg/kg, respectively.

Physical Property

In case of physical property Table-3e, higher water holding capacity (WHC) (82.24%) and Porosity (44.90) was observed with application of additive 9 only, which was followed by application of additive along with fertilizer and plant growth regulator with a tune value of WHC (82.10%) and Porosity (44.80%) respectively. However, lowest WHC (75.08%) and Porosity (41.00%) were observed with control which was followed by application of fertilizer only (76.36%) and (42.74%).

TABLE 3e

| ID | Treatment details | WHC (%) | Porosity (%) |
|---|---|---|---|
| 1 | Additive 9 | 82.24 | 44.90 |
| 2 | Control (Only water) | 75.08 | 41.00 |
| 3 | Fertilizer (12:32:16) | 76.36 | 42.74 |
| 4 | Additive 9 + Fertilizer (12:32:16) | 80.40 | 44.30 |
| 5 | Plant growth regulator (PGR) | 77.01 | 41.95 |
| 6 | PGR + fertilizer (12:32:16) | 78.55 | 42.64 |
| 7 | Additive 9 + Plant growth regulator (PGR) | 81.50 | 44.71 |
| 8 | Additive 9 + Plant growth regulator (PGR) + Fertilizer (12:32:16) | 82.10 | 44.80 |

Nutrient Content and Uptake by Okra

The content of nutrients viz., N, P, K, Fe, Mn, Zn, Cu, B and Na in okra were determined and the results are described here with.

Nutrient Content (%)

Primary Nutrients:

Primary nutrients content in straw of okra (Table-3f): N (1.65%), P (1.88%) and K (2.84%) content were higher with application of an additive in combination with fertilizer and plant growth regulator which as compared to the application of additive with plant growth regulator with a tune value of 1.60, 1.80 and 2.78%, respectively. Further it is seen that there was not much difference found with application of additive only when it compared with additive in combination with fertilizer and plant growth regulator and additive in combination with plant growth regulator in case content of N, P and K. Application of additive only recorded N, P and K content in straw of okra with a tune value of 1.50, 1.56 and 2.60%, respectively and remained identical with value of N, P and K content in straw due to use of an additive in combination with fertilizer and plant growth regulator and use of an additive in combination with plant growth regulator.

TABLE 3f

| ID | Treatment details | N (%) | P (%) | K (%) |
|---|---|---|---|---|
| 1 | Additive 10 | 1.50 | 1.56 | 2.60 |
| 2 | Control | 1.04 | 0.64 | 2.05 |
| 3 | Fertilizer (12:32:16) | 1.51 | 1.62 | 2.65 |
| 4 | Additive 10 + Fertilizer (12:32:16) | 1.55 | 1.71 | 2.70 |
| 5 | Plant growth regulator (PGR) | 1.09 | 1.03 | 2.30 |
| 6 | Additive 10 + Plant growth regulator (PGR) | 1.60 | 1.80 | 2.78 |
| 7 | Additive 10 + Plant growth regulator (PGR) + Fertilizer (12:32:16) | 1.65 | 1.88 | 2.84 |

Micronutrients:

Apart from the primary, micronutrients viz., Fe, Mn, Zn and Cu content straw of okra were also determined and the values are presented in Table-3g. The results revealed that contents of all the micronutrients were higher due to individual effect of additive 10 along with plant growth regulator and fertilizer and additive 10 along with fertilizer over control and fertilizer alone. However, higher values of content of Fe, Mn, Zn, Cu, B and lower Na was recorded to the extent of 925.0, 67.91, 20.25, 10.65, 29.71 and 466.50 ppm due to application of additive 10 along with fertilizer, respectively. However, identical values in content of Fe, Mn, Zn, Cu, B and lowest Na were recorded with application of additive 10 only with a tune value of 891.0, 63.46, 17.98, 9.05, 29.29 and 382.0 ppm, respectively. Results further showed that lowest values Cu Fe, Mn, Zn, B and highest Na content were recorded in control.

TABLE 3g

| ID | Treatment details | Fe (ppm) | Mn (ppm) | Zn (ppm) | Cu (ppm) | B (ppm) | Na (ppm) |
|---|---|---|---|---|---|---|---|
| 1 | Additive 10 | 891.00 | 63.46 | 17.98 | 9.05 | 29.29 | 382.00 |
| 2 | Control (Only water) | 524.96 | 43.31 | 12.53 | 5.93 | 21.63 | 622.00 |
| 3 | Fertilizer (12:32:16) | 536.13 | 54.48 | 14.05 | 6.91 | 24.94 | 658.00 |
| 4 | Additive 10 + Fertilizer (12:32:16) | 925.00 | 67.91 | 20.25 | 10.65 | 29.71 | 466.50 |
| 5 | Plant growth regulator (PGR) | 595.26 | 57.66 | 15.71 | 8.15 | 25.09 | 475.50 |
| 6 | Additive 10 + Plant growth regulator (PGR) | 930.00 | 68.50 | 20.55 | 10.80 | 29.95 | 660.00 |
| 7 | Additive 10 + Plant growth regulator (PGR) + Fertilizer (12:32:16) | 932.00 | 69.00 | 20.80 | 10.98 | 30.01 | 663.00 |

Nutrient Uptake:

Considering the concentration of N, P, K, Fe, Mn, Zn, Cu, B and Na in straw of okra and uptake of all the nutrients were computed and results thus obtained are provided herein.

Major Nutrients:

The results pertaining to N, P, and K uptake by okra presented in Table-3h. The results indicated that uptake (kg/ha) of N, P and K by okra was higher due to application of additive along with fertilizer and plant growth regulator with values of 81.60, 90.10 and 141.35 respectively. However, N, P and K uptake was recorded in control with a tune values of 41.88, 26.02 and 83.36 kg/ha, respectively.

TABLE 3h

| ID | Treatment details | N (Kg/ha) | P (Kg/ha) | K (Kg/ha) |
|---|---|---|---|---|
| 1 | Additive 10 | 70.81 | 73.64 | 122.73 |
| 2 | Control (Only water) | 41.88 | 26.02 | 83.36 |
| 3 | Fertilizer (12:32:16) | 76.38 | 81.94 | 134.04 |
| 4 | Additive 10 + Fertilizer (12:32:16) | 80.68 | 89.01 | 140.54 |
| 5 | Plant growth regulator (PGR) | 48.55 | 45.88 | 102.45 |
| 6 | Additive 10 + Plant growth regulator (PGR) | 81.10 | 89.72 | 140.94 |
| 7 | Additive 10 + Plant growth regulator (PGR) + Fertilizer (12:32:16) | 81.60 | 90.10 | 141.35 |

Micronutrients and NA:

The results related to uptake of Fe, Mn, Zn, Cu, B and Na by okra was presented in Table-3i. The results revealed that highest uptake of Fe, Mn, Zn, Cu and B were recorded with application of additive along with fertilizer and plant growth regulator with a tune value 4880.58, 365.11, 110.20, 56.12 and 156.92 g/ha. The results further showed that uptake of Fe, Mn, Zn, Cu and B were increased due to application of additive along with plant growth regulator and additive along with fertilizer over control and fertilizer to the extent of 4858.10, 360.52, 109.44, 55.68 and 156.22 g/ha, respectively and 4814.71, 353.48, 105.40, 55.43 and 154.64 g/ha respectively. Results further showed that lowest uptake of Na 1800.51 (g/ha) was recorded with application of additive along with plant growth regulator and fertilizer.

TABLE 3i

| ID | Treatment details | Fe (g/ha) | Mn (g/ha) | Zn (g/ha) | Cu (g/ha) | B (g/ha) | Na (g/ha) |
|---|---|---|---|---|---|---|---|
| 1 | Additive 10 | 4205.85 | 299.55 | 84.87 | 42.72 | 138.26 | 1803.18 |
| 2 | Control (Only water) | 2134.70 | 176.12 | 50.95 | 24.11 | 87.96 | 2529.30 |
| 3 | Fertilizer (12:32:16) | 2711.84 | 275.57 | 71.07 | 34.95 | 126.15 | 3328.28 |
| 4 | Additive 10 + Fertilizer (12:32:16) | 4814.71 | 353.48 | 105.40 | 55.43 | 154.64 | 2428.18 |

TABLE 3i-continued

| ID | Treatment details | Fe (g/ha) | Mn (g/ha) | Zn (g/ha) | Cu (g/ha) | B (g/ha) | Na (g/ha) |
|---|---|---|---|---|---|---|---|
| 5 | Plant growth regulator (PGR) | 2651.49 | 256.84 | 69.98 | 36.30 | 111.76 | 2118.04 |
| 6 | Additive 10 + Plant growth regulator (PGR) | 4858.10 | 360.52 | 109.44 | 55.68 | 156.22 | 1802.11 |
| 7 | Additive 10 + Plant growth regulator (PGR) + Fertilizer (12:32:16) | 4880.58 | 365.11 | 110.20 | 56.12 | 156.92 | 1800.51 |

It is seen from the above results that the additive is eco-friendly and an inexpensive source of nutrients. Therefore, to maintain the soil fertility, soil productivity and supply plant nutrients in balanced proportion for growth and yield of okra crop, an integrated approach is to be practiced under specific agro-ecological situation through the use of the additive of the present disclosure.

Test-2: Effect of Additive Prepared in Accordance with the Present Disclosure on Soil Properties (Observation Period: 9 Months)

Additive 5 (600 g of in the form of a cake), prepared in Experiment-1 was dissolved with hot water (15 L) to obtain a mixture. On an average, 600 g of additive was administered per acre on farm's one part and comparatively on average, 100 kg of 19:19:19 NPK mixture was administered per acre on farm's other part. Then, the mixture was applied using drip irrigation method to the soil. The soil on which this mixture had to be comparatively tested was evaluated for different effect on banana crop such as growth of banana, yield of banana, soil fertility after harvest of banana.

Effect of the Additive, Agricultural Composition and Agricultural Composition Along with Fertilizer of the Present Disclosure on the Growth of Banana The effect of the additive 5, agricultural composition and agricultural composition along with fertilizer prepared in accordance with the present disclosure on the growth of banana was studied. Additive 5, agricultural composition and agricultural composition along with fertilizer prepared in Experiment 1 was used for the study and the comparative results obtained are summarized in Table-4a. The study was conducted in presence and absence of the additive of the present disclosure to determine the effect of the additive on banana. The study was carried at a Village in Surat District (Gujarat). The Banana Grand Nine variety was used for the study and was sown in a field under planting of 1.8 m×1.8 m between two plants and Rows. The study was carried out for 50 plants and the result was extrapolated in to one Hectare. The height and girth of banana pseudostem were recorded at 150 days after plantation (DAP) and at flowering (Table-4a).

TABLE 4a

| Parameters | Presence of additive | Absence of additive | Agricultural composition | Agricultural composition + Fertilizer |
|---|---|---|---|---|
| Height of pseudostem at 150 DAP (cm) | 81.90 | 70.50 | 82.50 | 85.00 |
| Height of pseudostem at flowering (cm) | 195.20 | 171.00 | 198.20 | 200.20 |
| Pseudostem girth at 150 DAP (cm) | 30.80 | 23.40 | 31.10 | 31.85 |
| Pseudostem girth at flowering (cm) | 70.30 | 55.90 | 71.20 | 71.80 |
| Days of 50% inflorescence emergence (Days) | 246.00 | 277.00 | 245.00 | 242.00 |

The result revealed that application of the additive 5 in banana resulted in increased plant height and pseudostem girth at 150 DAP and at flowering stage as compared to the plants of without the additive. The increased pseudostem height was to the extent of 16.17 and 14.15%, while girth was 31.62 and 25.76% at 150 DAP and at flowering stage, respectively over the plants without the additive. Further, the application of agricultural composition and fertilizer resulted in increased plant height and pseudostem girth at 150 DAP and at flowering stage as compared to additive 5 alone and agricultural composition without fertilizer. The results further showed that 242 days required for 50% inflorescence emergence with application of the agricultural composition as compared to 246 days for the plants when the additive 5 was applied.

Effect of the Additive, Agricultural Composition and Agricultural Composition Along with Fertilizer on Yield and Yield Attributes of Banana The effect of the additive 5 on the yield and yield attributes of banana was studied and the comparative results obtained are summarized in Table-4b.

TABLE 4b

| Parameters | Presence of additive | Absence of additive | Agricultural composition | Agricultural composition + Fertilizer |
|---|---|---|---|---|
| Number of hands per bunch | 13.50 | 9.10 | 14.00 | 15.00 |
| Number of fingers per bunch | 186.00 | 128.00 | 190.00 | 194.00 |

TABLE 4b-continued

| Parameters | Presence of additive | Absence of additive | Agricultural composition | Agricultural composition + Fertilizer |
|---|---|---|---|---|
| Bunch weight (kg/plant) | 30.80 | 21.50 | 31.40 | 32.10 |
| Yield (t/ha) | 95.05 | 66.35 | 95.75 | 96.22 |

Table-4b illustrates the positive effects due to application of the agricultural composition along with fertilizer on yield and yield attributes of banana as compared to application of 19:19:19 NPK mixture. The data further revealed that number of hands per bunch, fingers per bunch, bunch weight (kg/plant) and yield (t/ha) were higher with application of agricultural composition as compared to application of 19:19:19 NPK mixture and additive 5 with a tune value of 15.00, 194.00, 32.10 and 96.22, respectively.

Effect of Additive, Agricultural Composition and Agricultural Composition Along with Fertilizer on Soil Fertility after Harvest of Banana The effect of the additive 5, agricultural composition and agricultural composition along with fertilizer on soil fertility after harvest of banana was studied and the results obtained are summarized in Table-4c.

TABLE 4c

| Soil fertility Parameters | Presence of additive | Absence of additive | Agricultural composition | Agricultural composition + Fertilizer |
|---|---|---|---|---|
| pH | 8.06 | 8.43 | 8.04 | 8.00 |
| C:N ratio | 34:1 | 61:1 | 33:1 | 30:1 |
| N (mg/kg) | 114 | 91.6 | 118 | 122 |
| P (%) | 1.06 | 0.66 | 1.10 | 1.15 |
| Bulk density (BD) (g/cm$^3$) | 1.11 | 1.21 | 1.07 | 1.02 |
| Porosity (%) | 51.39 | 46.94 | 51.82 | 52.50 |
| Ca (mg/kg) | 28.74 | 26.55 | 28.95 | 29.40 |
| Cu (mg/kg) | 65.99 | 58.64 | 66.32 | 66.90 |
| Zn (mg/kg) | 70.96 | 66.57 | 71.15 | 71.78 |
| Mn (mg/kg) | 696 | 619 | 698 | 700 |

The results illustrated that soil fertility measured after harvest of banana was improved due to application of agricultural composition along with fertilizer (Table-4c). The results revealed that pH and C:N ratio of soil was decreased due to application of the agricultural composition along with fertilizer as compared to when the additive 5 is applied and when additive 5 was not applied, with a tune value of 8.00 and 30:1. The reduction in BD of soil after harvest of banana was due to the increase in porosity of soil due to the application of the agricultural composition of the present disclosure. The results further revealed that minimum BD (g/cm$^3$) and maximum porosity (%) was found due to application of agricultural composition along with fertilizer with a tune figure of 1.02 and 52.50, respectively. The data further revealed that narrow down the C:N ratio of soil due to application of agricultural composition along with fertilizer resulted in higher availability of N, P, secondary as well as micronutrient. The content of N, Ca, Cu, Zn and Mn in soil after harvest of banana was higher with application of agricultural composition as compared to when the additive 5 is applied and when additive 5 was not applied with a tune value of 122, 29.40, 66.90, 71.78 and 700 ppm, respectively.

It is seen from the Tables 4a, 4b and 4c that higher yield of banana along with improved soil physico-chemical properties and sustained soil productivity is obtained using the agricultural composition along with fertilizer of the present disclosure as compared to in the presence of additive 5 and in absence of additive 5.

Test-3: Effect of Additive 10, Agricultural Composition and Agricultural Composition Along with Fertilizer Prepared in Accordance with the Present Disclosure on Soil Properties (Observation Period: 2 Months)

The method of testing effect of additive 10 on different properties of soil was similar to the method as disclosed in Test-1 of Experiment-2, except time period which is 2 months instead of 9 months. The effect of additive was tested on soil using additive 10.

Effect of the Additive, Agricultural Composition and Agricultural Composition Along with Fertilizer of the Present Disclosure on the Growth of Onion The effect of the additive 10, agricultural composition and agricultural composition along with fertilizer prepared in accordance with the present disclosure on the growth of onion was studied. Additive 10 prepared in Experiment 1 was used for the study. The study was conducted in the presence and in absence of the additive of the present disclosure to determine the effect of the additive on onion. Further, the effect of agricultural composition and agricultural composition along with fertilizer was studied. The study was carried out at a village in Bhavnagar District (Gujarat). The study was carried out in Two Plots: one plot, the additive of the present disclosure application and the other plot, urea application under Spacing of two rows and plants (15 cm×10 cm).

Effect of Additive 10, Agricultural Composition and Agricultural Composition Along with Fertilizer on Growth, Yield and Yield Attributes of Onion The effect of additive 10, agricultural composition and agricultural composition along with fertilizer on growth, yield and yield attributes of onion was carried and the comparative results obtained are summarized in Table-5a.

TABLE 5a

| Parameters | With Additive | With urea | Plant Growth Regulator (PGR) | Agricultural Composition | Agricultural Composition + Fertilizer |
|---|---|---|---|---|---|
| Plant height (cm) | 66.50 | 56.00 | 51.00 | 65.9 | 66.1 |
| Leaf area (m2) | 1050.30 | 930.15 | 895.05 | 1045.1 | 1069.6 |
| Ave. bulb weight (g) | 73.15 | 51.50 | 50.2 | 75.2 | 78.9 |
| Bulb yield (t/ha) | 48.80 | 34.30 | 33.7 | 50.1 | 52.3 |

It is seen from the above Table-5a that the plant height (cm), leaf area (m2), average bulb weight (g) and bulb yield (t/ha) of onion were higher due to application of agricultural composition along with fertilizer as compared to when the urea was used, with a respective value of 66.1, 1069.6, 78.9 and 52.3.

Effect of Additive 4, Agricultural Composition and Agricultural Composition Alonq with Fertilizer on Soil Fertility after Harvest of Onion The effect of the additive 4 on soil fertility after harvest of onion was studied and the comparative results obtained are summarized in Table-5b. Further, the effect of agricultural composition and agricultural composition along with fertilizer are studied and the comparative results obtained are summarized in Table-5c.

TABLE 5b

| Soil fertility Parameters | With Additive | With urea |
|---|---|---|
| pH | 7.96 | 8.23 |
| EC (dS/m) | 0.820 | 0.862 |
| C:N ratio | 13.6:1 | 37:1 |
| N (mg/kg) | 451 | 223 |
| Ca (mg/kg) | 22.16 | 20.22 |
| Zn (mg/kg) | 71.21 | 62.33 |
| Fe (mg/kg) | 44315 | 33924 |

TABLE 5c

| Soil fertility Parameters | Plant Growth Regulator (PGR) | Agricultural composition | Agricultural composition + Fertilizer |
|---|---|---|---|
| pH | 8.92 | 8.86 | 9.02 |
| EC (dS/m) | 0.206 | 0.348 | 0.283 |
| C:N ratio | 13:1 | 21.5:1 | 22.3:1 |
| Zn (mg/kg) | 1.43 | 1.96 | 2.02 |
| Fe (mg/kg) | 8.63 | 10.88 | 11.33 |
| Organic Carbon (%) | 0.31 | 0.92 | 0.99 |
| Available Nitrogen (kg/Hac) | 228 | 194 | 374 |
| Available P$_2$O$_5$ (kg/Hac) | 31.42 | 30.42 | 31.8 |
| K$_2$O (kg/Hac) | 128 | 336 | 346 |
| Manganese as Mn (mg/kg) | 11.4 | 14.12 | 15.14 |
| Copper as Cu (mg/kg) | 1.77 | 3.72 | 3.98 |
| Boron as B (mg/kg) | 0.12 | 0.14 | 0.11 |
| Exchangeable Na % | 2.31 | 3.37 | 2.52 |
| Exchangeable Ca (meq/100 gm) | 81.69 | 48.5 | 45.3 |
| Exchangeable Mg (meq/100 gm) | 14.25 | 17.49 | 15.19 |
| Exchangeable K (meq/100 gm) | 0.119 | 0.32 | 0.33 |
| Exchangeable Na (meq/100 gm) | 2.86 | 3.1 | 2.1 |
| Bulk Density (gm/cm3) | 1.76 | 1.74 | 1.76 |
| Porosity % | 42.05 | 37.25 | 43.61 |
| Moisture % | 17.13 | 25.26 | 25.68 |
| Total Bacterial Count (cfu/gm) | $1.8 \times 10^4$ | $1.7 \times 10^5$ | $1.6 \times 10^5$ |
| Total Organic Content (%) | 0.42 | 1.25 | 1.34 |
| Sulphur mg/kg | 20.14 | 33.55 | 35.24 |
| Total Nitrogen (%) | 0.032 | 0.058 | 0.06 |
| Water Holding Capacity (%) | 62.41 | 78.69 | 78.89 |
| Nitrifying Bacteria (/10 gm) | Present | Present | Present |
| Pseudomonas (/gm) | Absent | Absent | Absent |
| Surface Reducing Bacteria (SRB) | Present | Present | Present |

The results revealed that pH, EC and C:N ratio of soil decreased due to application of additive as compared to when urea was applied with a tune value of 7.96, 0.820 and 13.6:1, respectively. The data further revealed that there was a narrow down in the C:N ratio of soil due to application of additive 4 and agricultural composition along with fertilizer resulting in higher availability of N, Ca. Zn and Fe as compared to when the urea was used. The content of N, Ca. Zn and Fe in soil after harvest of onion was higher with application of additive 4 with a tune value of 451, 22.16, 71.21 and 44315 ppm, respectively.

It is seen from the above results that the nutrient management using the additive, agricultural composition along with fertilizer of the present disclosure helps in maintaining the optimum soil nutrients, soil productivity as well as enhancing the yield of onion.

Test-4: Effect of Additive 12 Prepared in Accordance with the Present Disclosure on Soil Properties which was Used for Harvesting Wheat (Observation Period: 2 Months)

The method of testing effect of the additive 12 on different properties of the soil was similar to the method as disclosed in Test-1 of Experiment-2 except time period which is 2 months for Test-1 of Experiment-2 instead of 9 months. The effect of the additive 12 was tested on soil which was used for harvesting wheat using the additive.

The effect of the additive prepared in accordance with the present disclosure on the growth of wheat was studied. Additive 12 prepared in Experiment 1 was used for the study. The study was conducted with application of the additive 12 of the present disclosure and application of mixture of DAP and Urea to determine the comparative effect of the additive 12 on wheat. The study was carried out at a village in Bhavnagar District (Gujarat).

Effect of Additive 12, Agricultural Composition and Agricultural Composition Along with Fertilizer on Growth, Yield and Yield Attributes of Wheat The effect of additive 12, plant growth regulator and agricultural composition on yield and yield attributes of wheat was carried out. The plant height, effective tillers, number of spikelets per spike, number of grains per spike, test weight (g), grain and straw yield (kg/ha) of wheat were recorded at harvest as influenced by the additive, plant growth regulator and agricultural composition of the present disclosure are presented in Table-6a.

TABLE 6a

| Parameters | With Additive | Plant Growth Regulator (PGR) | Agricultural composition | DAP and Urea mixture | Agricultural composition + Fertilizer |
|---|---|---|---|---|---|
| Plant height (cm) | 78.00 | 59.00 | 79.7 | 62.50 | 79.9 |
| Effective tillers | 82.00 | 75.00 | 84.00 | 71.00 | 89.00 |
| Number of spikelets per spike | 15.00 | 10.00 | 16.00 | 12.00 | 19.00 |
| Number of grains per spike | 38.00 | 26.00 | 41.00 | 25.00 | 47.00 |

TABLE 6a-continued

| Parameters | With Additive | Plant Growth Regulator (PGR) | Agricultural composition | DAP and Urea mixture | Agricultural composition + Fertilizer |
|---|---|---|---|---|---|
| Test weight (g) | 42.05 | 40.1 | 42.35 | 39.50 | 42.80 |
| Grain yield (kg/ha) | 4370 | 3191 | 4487 | 3050 | 4652 |
| Straw yield (kg/ha) | 5825 | 4286 | 5963 | 4165 | 6221 |

The results revealed that plant height, effective tillers, number of spikelets per spike, number of grains per spike, test weight (g), grain and straw yield (kg/ha) of wheat was higher in plants that received application of the agricultural composition along with fertilizer as compared to the plants that did not receive the agricultural composition along with fertilizer, with a respective tune value of 79.90, 89.00, 19.00, 47.00, 42.80, 4652 and 6221. The increment in grain and straw yield of wheat due to application of additive was to the extent of 43.28 and 39.85%, respectively as compared to the plants that use the mixture of DAP and Urea.

Effect of Additive 12, Agricultural Composition and Agricultural Composition Along with Fertilizer on Soil Fertility after Harvest of Wheat The effect of the additive on soil fertility after harvest of wheat was studied and the comparative results obtained are summarized in Table-6b. Further, the effect of the plant growth regulator and agricultural composition and the comparative results obtained are summarized in Table-6c.

TABLE 6b

| Soil fertility Parameters | With Additive | DAP and Urea mixture |
|---|---|---|
| pH | 8.21 | 8.28 |
| EC (dS/m) | 0.863 | 1.302 |
| C:N ratio | 19:1 | 72:1 |
| Bulk Density (BD) (g/cm3) | 1.14 | 1.31 |
| N (mg/kg) | 163 | 98.9 |
| P (%) | 1.86 | 1.31 |
| K (mg/kg) | 465 | 364 |
| Cu (mg/kg) | 82.36 | 68.72 |
| Zn (mg/kg) | 76.80 | 55.83 |
| Fe (mg/kg) | 61840 | 31317 |

TABLE 6c

| Soil fertility Parameters | Plant Growth Regulator (PGR) | Agricultural composition | Agricultural composition + Fertilizer |
|---|---|---|---|
| pH | 8.18 | 7.69 | 8.26 |
| EC (dS/m) | 148 | 115 | 125 |
| C:N ratio | 1.2:1 | 0.8:1 | 5.4:1 |
| BD (g/cm3) | 1.65 | 1.65 | 1.68 |
| Cu (mg/kg) | 5.26 | 4.38 | 0.072 |
| Zn (mg/kg) | 0.821 | 1.02 | 0.65 |
| Fe (mg/kg) | 42.3 | 30.77 | 25.2 |
| Organic carbon (%) | 0.35 | 0.35 | 0.556 |
| Available N (kg/Hac) | 259 | 280 | 306 |
| Available $P_2O_5$ (kg/Hac) | 31.7 | 29.8 | 43.48 |
| $K_2O$ (kg/Hac) | 318 | 482 | 327 |
| Manganese as Mn (mg/kg) | 22.48 | 22.1 | 23.6 |
| Boron as B (mg/kg) | 0.39 | 0.38 | 0.8 |
| Exchangeable Na (%) | 2.04 | 1.62 | 2.54 |
| Exchangeable Ca (meq/100 gm) | 30.61 | 33.98 | 42.93 |
| Exchangeable Mg (meq/100 gm) | 19.42 | 29.34 | 20.92 |
| Exchangeable K (meq/100 gm) | 0.29 | 0.48 | 0.294 |
| Exchangeable Na (meq/100 gm) | 1.5 | 1.56 | 1.67 |
| Infiltration Rate (mm/hr) | 4.82 | 4.8 | 4.93 |
| Porosity (%) | 44.1 | 42.8 | 48.72 |
| Moisture (%) | 20.98 | 19.74 | 9.51 |
| Total Bacterial Count (cfu/gm) | $1.8 \times 10^5$ | $2.1 \times 10^7$ | $1.8 \times 10^5$ |
| Total Organic Carbon (TOC) (%) | 0.47 | 0.47 | 0.75 |
| Sulphur (mg/kg) | 21.82 | 23.8 | 23 |
| Total Nitrogen (%) | 0.051 | 0.05 | 0.039 |
| C:N Ratio | 9.2:1 | 9.4:1 | 14:01 |
| Water Holding Capacity (WHC) (%) | 73.55 | 84.8 | 77.56 |
| Nitrifying Bacteria (/10 gm) | Present | Present | N/A |
| *Pseudomonas* (/gm) | Absent | Absent | N/A |
| Surface Reducing Bacteria (SRB) | Present | Present | N/A |

The results revealed that pH, EC, C:N ratio and BD of soil was decreased due to application of additive as compared to when the additive was not applied with a tune value of 8.21, 0.863, 19:1 and 1.14, respectively. The data further revealed that there was a narrow down in the C:N ratio of soil due to application of additive resulting in higher availability of N, K, Cu, Zn and Fe as compared to when the additive was not used. The content of N, Ca. Zn and Fe in soil after harvest of wheat was higher with application of additive with a tune value of 163, 465, 82.36, 76.80 and 61840 (mg/kg), respectively. Further, it is seen that the magnitude of increase in P content of soil was 41.98% as compared to when the additive was not used.

Further, the result revealed that C:N ratio, nitrogen, phosphate, manganese, exchangeable Na, Ca, infiltration rate, porosity, total organic carbon was increased due to use of agricultural composition along with fertilizer.

It is seen from the above results that the integrated use of the additive of the present disclosure was beneficial. Higher net return per hectare might be due to higher grain and straw yield, obtained using the additive of the present disclosure as compared to when the additive was not used.

Test-5: Effect of the Additive 13 Prepared in Accordance with the Present Disclosure on Soil Properties which was Used for Harvesting Pigeon Pea (Toor) (Observation Period: 2 Months)

The effect of the additive was tested on soil which was used for harvesting pigeon pea (Toor) using additive 13. The comparative report for different parameters is given in Table-7.

TABLE 7

| Test Name | LOQ | With additive | With Urea |
|---|---|---|---|
| Total Protein (gm/100 gm) | 0.5 | 19.58 | 16.47 |
| Energy (Kcal/100 gm) | — | 355.42 | 355.01 |
| Total Ash (gm/100 gm) | 0.1 | 3.75 | 3.94 |
| Calcium (as Ca) (mg/kg) | 2.5 | 657.32 | 508.85 |
| Iron (as Fe) (mg/kg) | 2.5 | 13 | 11.48 |
| Zinc (as Zn) (mg/kg) | 2.5 | 11.55 | 10.99 |
| Manganese (as Mn) (mg/kg) | 2.5 | 5.91 | 4.71 |

It is evident from Table-7 that total protein content, energy, and total ash of the soil along with all five micro nutrients such as calcium, iron, sodium, copper and zinc increased.

Effect of Additive 13, Agricultural Composition and Agricultural Composition Along with Fertilizer on Yield and Yield Attributes of Pigeon Pea The study was carried out with and without the additive of the present disclosure in different plots at a village in Narmada District (Gujarat). The Pigeon pea crop was planted in 90 cm between two rows and 20 cm of two plants under fields.

The result pertaining to plant height, number of branches per plant, number of pods per plant, grain and haulm yield of pigeon pea crop recorded at harvest as influenced by additive of the present disclosure is summarized in Table-7a. Further, the effect of the plant growth regulator and agricultural composition and the comparative results obtained are summarized in Table-7b.

It is seen from Tables 7 and 7a that the management of nutrient with the additive and agricultural composition of the present disclosure is essential in realizing higher growth, yield and yield attributes of pigeon pea. The use of nutrient along with additive not only improves yield but also improves properties of soil and the environment.

TABLE 7b

| Test Name | Plant Growth Regulator (PGR) | Agricultural composition | Agricultural composition + Fertilizer |
|---|---|---|---|
| Iron (as Fe) (mg/kg) | 11.26 | 12.48 | 14.47 |
| Zinc (as Zn) (mg/kg) | 4.8 | 4.4 | 547 |
| Manganese (as Mn) (mg/kg) | 21.2 | 23.42 | 26.13 |
| Organic Carbon (%) | 0.52 | 0.52 | 0.52 |
| Available N (Kg/Hac) | 256 | 264 | 296 |
| Available $P_2O_5$ (Kg/Hac) | 41.86 | 42.18 | 47.08 |
| $K_2O$ (Kg/Hac) | 558 | 968 | 470 |
| Copper as Cu (mg/kg) | 14.1 | 15.1 | 18.49 |
| Boron as B (mg/kg) | 0.24 | 0.32 | 0.31 |
| Exchangeable Na (%) | 2.63 | 3.03 | 3.09 |
| Exchangeable Ca (meq/100 gm) | 40.91 | 31.57 | 42.69 |
| Exchangeable Mg (meq/100 gm) | 31.77 | 20.56 | 26.53 |
| Exchangeable K (meq/100 gm) | 0.562 | 0.998 | 0.43 |
| Exchangeable Na (meq/100 gm) | 2.9 | 2.37 | 2.22 |
| pH | 9.44 | 9.06 | 7.8 |
| Electrical conductivity (dS/m) | 0.176 | 0.202 | 0.177 |
| Infiltration rate (mm/hr) | 4.86 | 4.95 | 5.08 |
| Bulk Density (gm/cm$^3$) | 1.68 | 1.68 | 1.69 |
| Porosity (%) | 37.8 | 37.96 | 45.81 |
| Moisture (%) | 21.92 | 21.02 | 5.23 |
| Total Bacterial Count (cfu/gm) | $1.9 \times 10^5$ | $1.7 \times 10^7$ | $1.9 \times 10^5$ |
| TOC (%) | 0.7 | 0.7 | 1.06 |
| Sulphur (mg/kg) | 30.65 | 34.07 | 17 |
| Total Nitrogen (%) | 0.066 | 0.068 | 0.08 |

TABLE 7a

| Soil fertility Parameters | With Additive | Plant Growth Regulator (PGR) | Agricultural composition | With Urea | Agricultural composition + Fertilizer |
|---|---|---|---|---|---|
| Plant height (cm) | 149.0 | 121.0 | 142.0 | 133.0 | 148.0 |
| Number of branches per plant | 14.0 | 8.0 | 12.0 | 10.0 | 15.0 |
| Number of pods per plant | 221.0 | 179 | 211 | 172.0 | 226 |
| Grain yield (kg/ha) | 1565 | 1162 | 1332 | 1060 | 1585 |
| Haulm yield (kg/ha) | 1810 | 1309 | 1586 | 1285 | 1822 |

It is seen from Table-7a that the plant height, number of branches per plant, number of pods per plant, grain and haulm yield of pigeon pea crop was higher under the treatment receiving application of additive and agricultural composition along with fertilizer over the plant that used Urea. The plant height, number of branches per plant, number of pods per plant, grain and haulm yield of pigeon pea crop due to application of agricultural composition along with fertilizer was 148.00, 15.0, 226, 1585 and 1822 respectively over the plant that used Urea.

TABLE 7b-continued

| Test Name | Plant Growth Regulator (PGR) | Agricultural composition | Agricultural composition + Fertilizer |
|---|---|---|---|
| C:N ratio | 10.6:1 | 10.2:1 | 12:1 |
| Water holding capacity (%) | 81.63 | 79.7 | 83.62 |

TABLE 7b-continued

| Test Name | Plant Growth Regulator (PGR) | Agricultural composition | Agricultural composition + Fertilizer |
|---|---|---|---|
| Nitrifying Bacteria (/10 gm) | Present | Present | N/A |
| *Pseudomonas* (/gm) | Present | Absent | N/A |
| Surface Reducing Bacteria (SRB) | Present | Present | N/A |

Test-6: Effect of the Additive, Plant Growth Regulator and Agricultural Composition of the Present Disclosure on Growth, Yield and Yield Attributes of Groundnut The effect of the additive 14 prepared in accordance with the present disclosure on the growth of groundnut was studied. The study was carried out for additive 14 prepared in Experiment 1, at Devdia Village in Amreli District (Gujarat). The Groundnut crop was planted in furrow between two rows of 45 cm under fields. The study was conducted to application of the additive of the present disclosure and to application of 12:32:16 (NPK mixture) to determine the effect of the additive on groundnut.

The plant height, number of branches per plant, plant spread, number of root nodules per plant, pod weight per plant, 100 seed weight, pod and haulm yield of groundnut were recorded at harvest as influenced by additive and agricultural composition are presented in Table-8a. Further, the effect of the plant growth regulator and agricultural composition and the comparative results obtained are summarized in Table-8b and 8c.

TABLE 8a

| Parameters | With Additive | Plant Growth Regulator (PGR) | Agricultural composition | 12:32:16 (NPK mixture) | Agricultural composition + Fertilizer |
|---|---|---|---|---|---|
| Plant height (cm) | 23.50 | 22.6 | 24.8 | 16.60 | 25.9 |
| Number of branches per plant | 11.0 | 6.0 | 11.0 | 6.0 | 12.0 |
| Plant spread (cm) | 22.40 | 15.39 | 22.91 | 17.25 | 23.13 |
| Number of root nodules per plant | 85.0 | 69.0 | 73.0 | 65.0 | 87.0 |
| Pod weight per plant (g) | 14.50 | 8.9 | 16.2 | 8.50 | 19.1 |
| 100 seed weight (g) | 49.30 | 33.3 | 52.6 | 33.80 | 51.5 |
| Pod yield (kg/ha) | 2915 | 2105 | 3257 | 2010 | 3839 |
| Haulm yield (kg/ha) | 3220 | 2345 | 3476 | 2280 | 4103 |

The results revealed that plant height (cm), number of branches per plant, plant spread (cm), number of root nodules per plant, pod weight per plant (g), 100 seed weight (g), pod and haulm yield (kg/ha) of groundnut was higher in treatment receiving application of agricultural composition as compared to application of 12:32:16 (NPK mixture) with a respective tune value of 25.9, 12.0, 23.13, 87.0, 19.10, 51.50, 3839 and 4103.

Effect of Additive 14, Agricultural Composition and Agricultural Composition Along with Fertilizer on Soil Fertility after Harvest of Groundnut TABLE 8b

| Soil fertility Parameters | With Additive | 12:32:16 (NPK mixture) |
|---|---|---|
| pH | 7.84 | 7.76 |
| EC (dS/m) | 0.293 | 0.272 |
| P (%) | 2.11 | 1.65 |
| K (mg/kg) | 420 | 167 |
| Ca (mg/kg) | 31.82 | 28.62 |
| Cu (mg/kg) | 53.39 | 51.92 |
| B(mg/kg) | 39.3 | 10.7 |

TABLE 8c

| Soil fertility Parameters | Plant Growth Regulator (PGR) | Agricultural composition | Agricultural composition + Fertilizer |
|---|---|---|---|
| pH | 8.56 | 8.68 | 7.90 |
| EC (dS/m) | 0.27 | 0.19 | 183 |
| Cu (mg/kg) | 11.45 | 11.7 | 13.08 |
| B(mg/kg) | 0.39 | 0.38 | 0.8 |
| Organic Carbon (%) | 0.35 | 0.35 | 0.556 |
| Available N (kg/Hac) | 259 | 280 | 306 |
| Available $P_2O_5$ (kg/Hac) | 31.7 | 29.8 | 43.48 |
| $K_2O$ (kg/Hac) | 318 | 482 | 327 |
| Iron as Fe (mg/kg) | 11.18 | 11.2 | 11.43 |
| Manganese as Mn (mg/kg) | 22.48 | 22.1 | 23.6 |
| Zinc as Zn (mg/kg) | 3.25 | 3.15 | 3.97 |
| Copper as Cu (mg/kg) | 11.45 | 11.7 | 13.08 |
| Boron as B (mg/kg) | 0.39 | 0.38 | 0.80 |
| Exchangeable Na (%) | 2.04 | 1.62 | 2.54 |
| Exchangeable Ca (meq/100 gm) | 30.61 | 33.98 | 42.93 |
| Exchangeable Mg (meq/100 gm) | 19.42 | 29.34 | 20.92 |
| Exchangeable K (meq/100 gm) | 0.29 | 0.18 | 0.294 |
| Exchangeable Na (meq/100 gm) | 1.5 | 1.56 | 1.67 |

TABLE 8c-continued

| Soil fertility Parameters | Plant Growth Regulator (PGR) | Agricultural composition | Agricultural composition + Fertilizer |
|---|---|---|---|
| pH | 8.56 | 8.68 | 7.9 |
| Infiltration Rate (mm/hr) | 4.82 | 4.8 | 4.93 |
| Bulk Density (Gm/cm$^3$) | 1.72 | 1.7 | 1.73 |
| Porosity (%) | 44.1 | 42.8 | 48.72 |
| Moisture (%) | 2.98 | 19.74 | 9.51 |
| Total Bacterial Count (Cfu/gm) | $1.8 \times 10^5$ | $2.1 \times 10^7$ | $1.8 \times 10^5$ |
| TOC (%) | 0.47 | 0.47 | 0.75 |
| Sulphur (mg/kg) | 21.82 | 23.8 | 23 |
| Total Nitrogen (%) | 0.051 | 0.05 | 0.039 |
| C:N Ratio | 9.2:1 | 9.4:1 | 14:01 |

TABLE 8c-continued

| Soil fertility Parameters | Plant Growth Regulator (PGR) | Agricultural composition | Agricultural composition + Fertilizer |
|---|---|---|---|
| Water Holding Capacity (%) | 73.55 | 84.8 | 77.56 |
| Nitrifying Bacteria (/10 gm) | Present | Present | N/A |
| *Pseudomonas* (/gm) | Absent | Present | N/A |
| Surface Reducing Bacteria (SRB) | Present | Present | N/A |

The results revealed that soil fertility measured after harvest of groundnut was improved due to application of agricultural composition. The data revealed that content of P, K, Ca, Cu and B in soil after harvest of groundnut was higher with application of additive as compared to when the 12:32:16 (NPK mixture) was applied with a tune value of 2.11, 420, 31.82, 53.39 and 39.3 mg/kg, respectively. However, results further revealed that P content in soil was higher with increased in magnitude of 27.88% as compared to when the 12:32:16 (NPK mixture).

It is seen from Tables 8a and 8b that the use of the additive and agricultural composition of the present disclosure improves the groundnut yield and physical, chemical and biological properties as compared to when the additive is not used. The additive used for the cultivation of groundnut crop is capable of fixing atmospheric nitrogen with the help of the bacteria *Rhizobium*. Due to the prohibitive cost of chemical fertilizer, farmers do not apply nutrients to this energy rich legume crops. The additive prepared from indigenously available ingredients has enhanced efficiency and reduces the requirement of chemical fertilizers.

Experiment-3: Effect of the Additives Prepared in Accordance with the Present Disclosure on Yield of Different Crops Additive (600 g of the fertilizer in the form of cake) prepared in Experiment-1, was dissolved with hot water (15 liter, 60° C.) to obtain a mixture. On an average, 600 g of additive was administered per acre. Then, the mixture containing additive was applied using drop method to the crops such as pigeon pea, rice, sugarcane, lady finger (okra) wheat and groundnut at the time of watering these crops. The yield of these crops is reported in Table-9.

TABLE 9

| | Crop | | | | | |
|---|---|---|---|---|---|---|
| Application | Pigeon pea | Rice | Sugarcane | Ladyfinger | Wheat | Groundnut |
| With Application of the additive of present disclosure | 1565 (kg/ha) | 3500 (kg/ha) | 175(ton/ha) | 8100(kg/ha) | 4370 (kg/ha) | 2915 (kg/ha) |
| With Application of Market fertilizer | 1060 (kg/ha) | 2250 (kg/ha) | 130(ton/ha) | 6100(kg/ha) | 3050 (kg/ha) | 2010 (kg/ha) |

From the above results in Table-9, it is observed that the additive of the present disclosure is effective in improving the growth of the plant, is stable, is required in small quantity and aids in the uptake of the macronutrients/micronutrients in the soil such as potassium, magnesium, sodium, selenium, and phosphorus. Hence, the additive enhances the conditioning of the soil and increases the soil water absorption and water retention ability, ultimately increase porosity and permeability.

Overall, the additive of the present disclosure improves the plant yield up to 60%. The additive of the present disclosure also improves the nutrient contents of edible content of plants/crops.

Experiment-4: Effect of the Additive Prepared in Accordance with the Present Disclosure on Water Sample (Biodegradability Test)

The effect of the additive on different water sample was analysed and the result obtained in summarized in Table-10. Additive 1 was used for the analysis. The pH of the sample was analyzed as per IS3025(P-11)83Re.02, the conductivity was analyzed as per IS3025(P-14)84Re.02, the nitrifying bacteria were detected as per FCO:2006, the SRB was analyzed as per IS:13428 Annex. C 2005, and *Pseudomonas* was detected as per IS:13428 Annex. D 2005.

TABLE 10

| S. No. | Parameters | Result | | | | | | |
|---|---|---|---|---|---|---|---|---|
| | | Ground water without additive (Day 0) | Ground water with additive (Day 0) | Ground water without additive (Day 10) | Ground water with additive (Day 10) | Ground water without additive (Day 22) | Ground water with additive (Day 22) | Ground water with additive (Day 72) |
| 1 | pH | 8.01 | 6.53 | 8.60 | 8.89 | 8.77 | 8.28 | 7.15 |
| 2 | Conductivity (dS/m) | 1.195 | 1.633 | 1.172 | 5.912 | 1.285 | 4.219 | 0.516 |
| 3 | Nitrifying bacteria (/ml) | Absent | Absent | Present | Present | Present | Present | $2.0 \times 10^2$ |
| 4 | Surface Reducing Bacteria (SRB) (/50 ml) | Absent | Absent | Absent | Present | Present | Present | Absent |
| 5 | *Pseudomonas* (/ml) | Absent | Absent | Present | Absent | Absent | Absent | Absent |

It seen from Table-10 that an additive in the ground water decomposed quickly rather than taking more time by the action of microorganisms. It means that the additive that can break down into simpler natural materials (chemicals) such as water, carbon dioxide, and oxygen, in the environment without causing harm. It can be said that the additive of the present disclosure is easily biodegradable and hence does not harm the environment.

Experiment-5: Effect of the Additive Prepared in Accordance with the Present Disclosure on the Stability in Hard Water The efficacy of the additive of the present disclosure in the presence of hard water was analyzed and the results obtained are summarized in Table-11. Additive 1 was used for the analysis, and the analysis was carried out using the pot test method described by P. K. Gupta.

Experiment Conducted on Response of Rice Under Different Salinity Level in Presence and Absence of Additive A pot experiment was conducted to determine the response of rice under different salinity level in presence and absence of the additive of the present disclosure. The pot experiment was conducted for 30 days and crop was irrigated with saline water of 0, 2, 4 and 6 dSm$^{-1}$. The saline water was artificially made from NaCl in laboratory condition.

soil when paddy crop was grown in presence of additive with use of saline water of 0, 2, 4 and 6 EC. However, there was a significant reduction in the EC of soil after 30 Days of paddy in presence of additive when crop was irrigated with 0, 2, 4 and 6 EC water. However, decrease in soil EC was recorded to the extent of 45.61, 33.91, 21.76 and 7.46% when paddy was irrigated with saline water of 0, 2, 4 and 6 EC with additive, respectively as compared to when additive was not used.

Figure 1A:
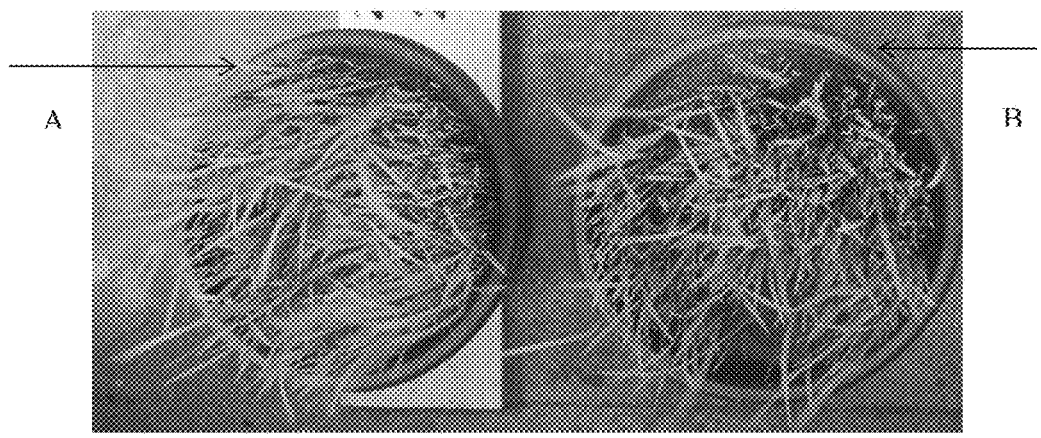
FIGS. 1A and 1B illustrate the comparison of plant growth with (A) and without (B) the additive of the present disclosure. It is seen from FIGS. 1A and 1B that the plants (A) that were grown in the presence of the additive of the present disclosure exhibited more luxuriant growth, as compared to when the plants (B) were not grown properly in the absence of the additive of the present disclosure.
Figure 1B:
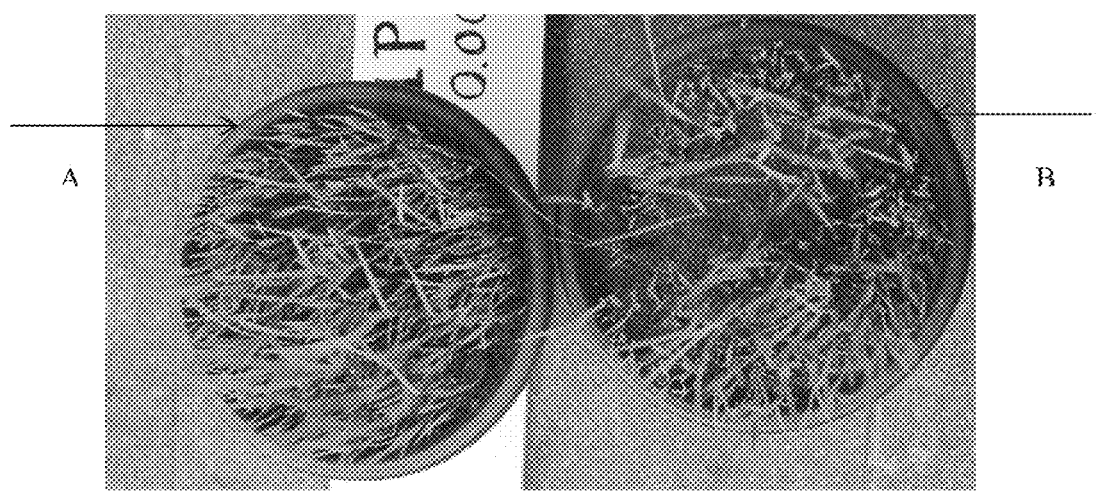
Figure 2:
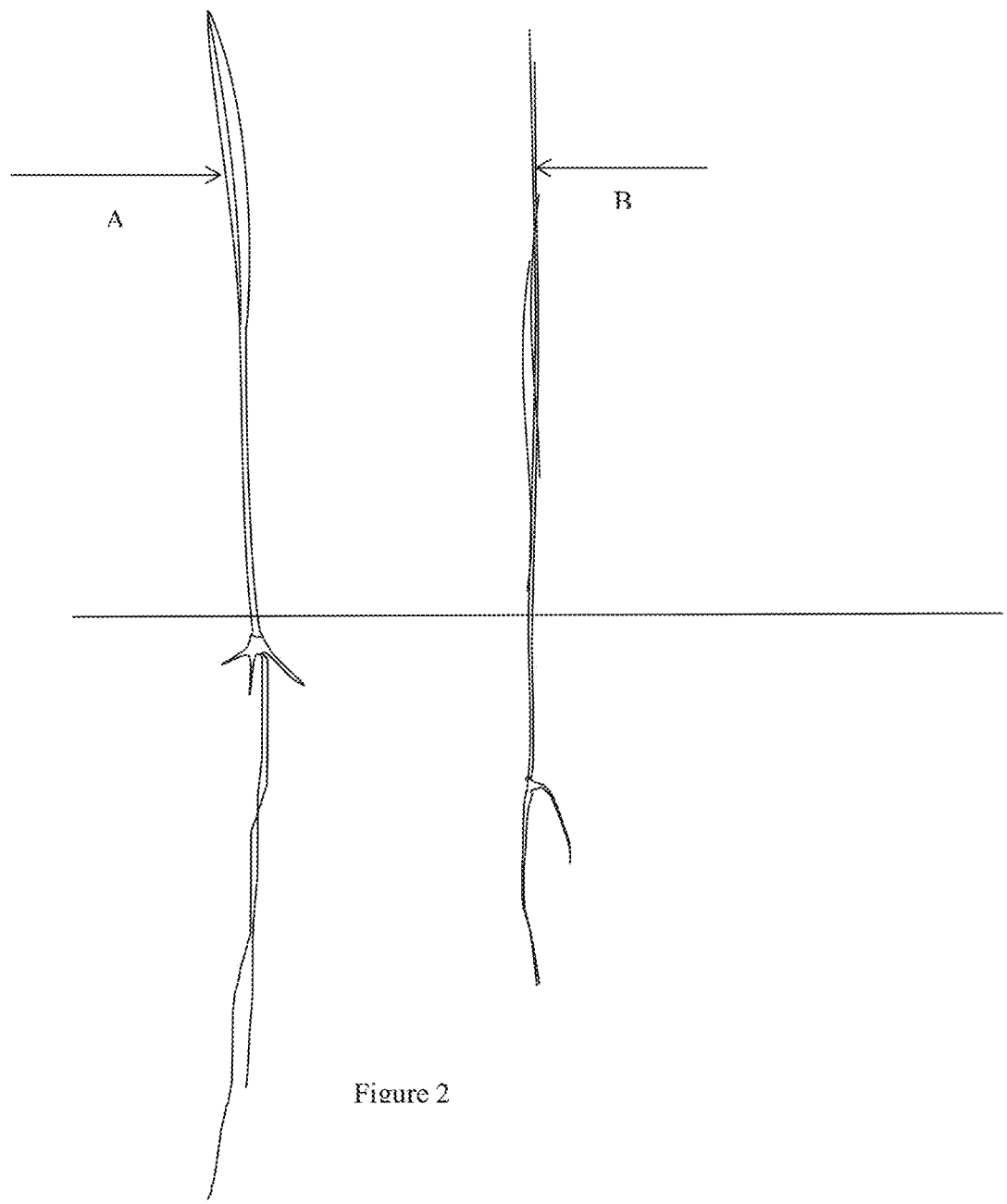
FIG. 2 illustrates the comparison of the root growth of plants grown with (A) and without (B) the additive of the present disclosure. It is seen from FIG. 2 that the additive of the present disclosure aids in the strengthening and development of the root system of the plants that when grown in the present of the additive of the present disclosure.

Experiment-6: Effect of the Agricultural Composition and Agricultural Composition Along with Fertilizer Prepared in

TABLE 11

| S. No | Parameters | Unit | Result | | | | | | | | |
|---|---|---|---|---|---|---|---|---|---|---|---|
| | | | Original Soil | Soil without additive* | Soil with additive* | Soil without additive ** | Soil with additive ** | Soil without additive# | Soil with additive# | Soil without additive## | Soil with additive## |
| 1 | pH | — | 8.24 | 8.15 | 8.11 | 8.38 | 8.30 | 8.41 | 8.63 | 8.45 | 8.38 |
| 2 | Conductivity | dS/m | 0.424 | 0.415 | 0.285 | 0.612 | 0.457 | 0.856 | 0.703 | 1.210 | 1.126 |

\* = 0.00 dS/m Conductivity:
\*\* = 2.0 dS/m Conductivity;
\# = 4.0 dS/m Conductivity;
\#\# = 6.0 dS/m conductivity It is seen from Table-10 that the additive of the present disclosure is stable in hard water.

The pH and EC was measured after 30 days clearly indicated that pH and EC of soil decreased when rice crop was irrigated with saline water up to 6 EC in presence of additive with positive response on growth of paddy as compared to when the additive was not used. The results further indicated that there was not much decrease in pH of Accordance with the Present Disclosure on Soil Fertility after Harvest of Bottle Gourd.

The study was carried out at the Village of Kuched in Naysari District (Gujarat). Bottle Gourd plant was used for the study. The chemical and physical pre-analysis of soil showed in Table-12. The seed of bottle gourd were sown in a plot size of 6.0 m×5.0 m spaced with 60.0 cm×20.0 cm to keep 250 plants per plot for each treatment. Plant growth regulator, agricultural composition and agricultural composition along with fertilizer prepared in Experiment 1 were used for the studies. Effect of Plant growth regulator, agricultural composition and agricultural composition along with fertilizer on soil fertility after harvest of bottle gourd is summarized in table 12 and effects of plant growth regulator, agricultural composition and agricultural composition along with fertilizer on plants is summarized in table 13.

TABLE 12

| Parameters | Pre Analysis of soil | Plant Growth Regulator (PGR) | Agricultural Composition | Agricultural composition + Fertilizer |
|---|---|---|---|---|
| TOC (%) | 0.42 | 0.218 | 0.739 | 0.22 |
| Average N (kg/hac) | 228 | 180 | 240 | 222 |
| Average $P_2O_5$ (kg/hac) | 31.42 | 28.2 | 25.18 | 24.2 |
| Average $K_2O$ (kg/hac) | 128 | 148 | 154 | 172 |
| Fe (mg/kg) | 8.63 | 7.2 | 7.14 | 7.38 |
| Mn (mg/kg) | 11.4 | 12.18 | 14.2 | 13.2 |
| Zn (mg/kg) | 1.43 | 1.43 | 1.2 | 1.38 |
| Cu (mg/kg) | 1.77 | 1.5 | 1.48 | 1.3 |
| B (mg/kg) | 0.12 | 0.23 | 0.18 | 0.12 |
| EX Na (%) | 2.31 | 0.73 | 0.75 | 0.52 |
| EX Ca % (meg/100 gm) | 81.69 | 90.27 | 60.83 | 92.22 |
| EX Mg % (meg/100 gm) | 14.25 | 6.88 | 33.61 | 21.55 |
| EX K % (meg/100 gm) | 0.119 | 0.13 | 0.14 | 0.178 |
| Ex Na % (meg/100 gm) | 2.86 | 0.86 | 1.011 | 0.76 |
| pH | 8.92 | 9.96 | 9.95 | 9.99 |
| Electrical Conductivity (dS/m) | 0.206 | 0.225 | 0.21 | 0.212 |
| Infiltration Rate (mm/hr) | 3.98 | 3.9 | 3.92 | 3.98 |
| Bulk Density (gm/cm3) | 1.76 | 1.7 | 1.69 | 1.72 |
| Porosity (%) | 42.05 | 47.8 | 45.84 | 44.2 |
| Moisture (%) | 17.13 | 16.41 | 15.67 | 17.68 |
| Total Bacterial Count (cfu/gm) | $1.8 \times 10^4$ | $1.7 \times 10^6$ | $1.6 \times 10^6$ | $1.7 \times 10^5$ |
| Surface Reducing Bacteria (SRB) (/10 gm) | PRES. | PRES. | PRES. | PRES. |
| *Pseudomonas* (/gm) | ABSENT | ABSENT | ABSENT | PRES. |
| Nitrifying Bacteria (/gm) | PRES. | PRES. | PRES. | PRES. |
| Organic Carbon (%) | 0.310 | 0.162 | 0.548 | 0.162 |
| Sulphur (mg/kg) | 20.14 | 28.21 | 28.06 | 29.29 |
| Total Nitrogen (%) | 0.032 | 0.022 | 0.052 | 0.02 |
| C:N ratio | 13.0:1 | 9.9:1 | 14.2:1 | 11.0:1 |
| Water holding capacity (%) | 62.41 | 75.1 | 72.49 | 68.6 |

The results showed that chemical properties improved significantly with application of agricultural composition as compared to plant growth regulator.

TABLE 13

| Parameters | Plant Growth Regulator (PGR) | Agricultural Composition | Agricultural Composition + Fertilizer |
|---|---|---|---|
| Nitrogen (%) | 1.6 | 2.9 | 2.5 |
| Phosphorus (%) | 0.24 | 0.92 | 1.2 |
| Potassium (%) | 1.6 | 1.6 | 1.7 |
| Sulphur (%) | 0.032 | 0.043 | 0.038 |
| Sodium (mg/kg) | 604 | 430 | 618 |
| Boron (mg/kg) | 28.3 | 19.46 | 19.33 |
| Iron (mg/kg) | 98 | 78.43 | 85.7 |
| Manganese (mg/kg) | 193 | 124 | 239 |
| Zinc (mg/kg) | 4.38 | 9.86 | 9.12 |
| Copper (mg/kg) | 16.82 | 23.39 | 26.6 |
| Calcium (%) | 4.01 | 3.51 | 3.97 |
| Magnesium (%) | 1.27 | 1.18 | 1.27 |
| Moisture (%) | 88.87 | 88.54 | 90.81 |

The results showed that chemical properties improved significantly with application of agricultural composition along with fertilizer as compared to plant growth regulator or agricultural composition alone.

Experiment-7: Effect of the Additive, Additive with Fertilizer Prepared in Accordance with the Present Disclosure on Soil Fertility after Harvest of Sugarcane, Mustard, Cotton, Millet and Spinach.

Sugarcane—

The study was carried out at the Village of Pinsad in Naysari District (Gujarat). The field size was 8 acres. Additive 4 prepared in Experiment 1 was used for the studies. The results pertaining to changes in chemical properties of soil are presented in Table-14.

TABLE 14

| Parameters | Fertilizer | Additive + Fertilizer |
|---|---|---|
| pH | 7.88 | 7.35 |
| Conductance. (mmho/cm) | 1.036 | 0.32 |
| Salinity (%) | 0.0786 | 0.0079 |
| C:N Ratio | 43:1 | 94:1 |
| TOC (%) | 0.43 | 0.94 |
| Nitrogen (%) | 0.0124 | 0.0095 |
| P (%) | 2.25 | 0.78 |
| K (%) | 0.0622 | 0.12 |
| B. Density (gm/cm$^3$) | 1.34 | 1.25 |
| Porosity (%) | 44.78 | 48.55 |
| Cu (%) | 0.0088 | 0.0068 |
| Zn (%) | 0.0073 | 0.0083 |
| Fe (%) | 4.1501 | 2.77 |
| Mn (%) | 0.0872 | 0.074 |
| Mb (%) | 0.0006 | 0.0003 |
| Ni (%) | 0.0059 | 0.0079 |
| Cl (%) | 0.0438 | 0.0043 |
| B (%) | 0.0009 | 0.0013 |
| Ca (%) | 0.0063 | 0.0054 |
| Mg (%) | 0.0023 | 0.0001 |
| S (%) | 0.0192 | 0.0027 |
| Crop yield | 46 Ton/Acre | 64 Ton/Acre |

The results showed that chemical properties improved significantly with application of additive along with fertilizer as compared to fertilizer alone. Further, the yield of crop improved with application of additive along with fertilizer as compared to fertilizer alone.

Mustard—

The study was carried out at the Village of Maroli in Naysari District (Gujarat). The plot was divided in two parts and size of each plot was 35 m$^2$. Additive 6 prepared in Experiment 1 was used for the studies. The results pertaining to changes in chemical properties of soil are presented in Table-15.

TABLE 15

| Parameters | Fertilizer | Additive + Fertilizer |
|---|---|---|
| pH | 8.69 | 8.61 |
| Conductance (mmho/cm) | 0.229 | 0.228 |
| Salinity (%) | 0.012 | 0.019 |
| C:N Ratio | 14:1 | 3:1 |
| TOC (%) | 0.07 | 0.03 |
| Nitrogen (%) | 0.005 | 0.01 |
| P (%) | 0.75 | 1.19 |
| K (%) | 0.03 | 0.04 |
| B. Density (gm/cm$^3$) | 1.32 | 1.26 |
| Porosity (%) | 37.44 | 40.38 |
| Cu (%) | 0.0006 | 0.0061 |
| Zn (%) | 0.01 | 0.0061 |
| Fe (%) | 3.512 | 3.3128 |
| Mn (%) | 0.0919 | 0.0989 |
| Ni (%) | 0.0047 | 0.00 |
| Cl (%) | 0.0066 | 0.0066 |
| B (%) | 0.0007 | 0.0013 |
| Ca (%) | 0.002 | 0.002 |
| Mg (%) | 0.003 | 0.0005 |
| S (%) | 0.0062 | 0.0066 |

The results showed that chemical properties improved significantly with application of additive along with fertilizer as compared to fertilizer alone.

Cotton—

The study was carried out at the Village of Datha in Bhavnagar District (Gujarat). The field size was 2 acres. Additive 7 prepared in Experiment 1 was used for the studies. The results pertaining to changes in chemical properties of soil are presented in Table-16.

TABLE 16

| Parameters | Fertilizer | Additive + Fertilizer |
|---|---|---|
| pH | 7.79 | 7.88 |
| Conductance (mmho/cm) | 0.734 | 0.964 |
| Salinity (%) | 0.0531 | 0.0508 |
| C:N Ratio | 58:1 | 26.5:1 |
| TOC (%) | 0.58 | 0.53 |
| Nitrogen (%) | 0.0149 | 0.0179 |
| P (%) | 2.20 | 1.23 |
| K (%) | 0.0369 | 0.026 |
| B. Density (gm/cm$^3$) | 1.14 | 1.06 |
| Porosity (%) | 53.08 | 55.46 |
| Cu (%) | 0.0074 | 0.0079 |
| Zn (%) | 0.0072 | 0.0085 |
| Fe (%) | 3.84 | 5.3223 |
| Mn (%) | 0.0717 | 0.0809 |
| Mb (%) | 0.0009 | 0.0001 |
| Ni (%) | 0.0052 | 0.0053 |
| Cl (%) | 0.029 | 0.0278 |
| B (%) | 0.0018 | 0.002 |
| Ca (%) | 0.0034 | 0.0043 |
| Mg (%) | 0.0003 | 0.0011 |
| S (%) | 0.013 | 0.011 |
| Crop Yield | 8.4 Quintal/Acre | 12.8 Quintal/Acre |

The results showed that chemical properties improved significantly with application of additive along with fertilizer as compared to fertilizer alone. Further, the yield of crop improved with application of additive along with fertilizer as compared to fertilizer alone.

Millet—

The study was carried out at the Village of Datha in Bhavnagar District (Gujarat). The field size was 2 acres. Additive 5 prepared in Experiment 1 were used for the studies. The results pertaining to changes in chemical properties of soil are presented in Table-17.

TABLE 17

| Parameters | Fertilizer | Additive + Fertilizer |
|---|---|---|
| pH | 7.89 | 7.95 |
| Conductance (mmho/cm) | 0.166 | 0.186 |
| Salinity (%) | 0.0083 | 0.0128 |
| C:N Ratio | 56:1 | 43:1 |
| TOC (%) | 0.56 | 0.43 |
| Nitrogen (%) | 0.0104 | 0.0099 |
| P (%) | 2.16 | 1.74 |
| K (%) | 0.0337 | 0.027 |
| B. Density | 1.35 | 1.03 |
| Porosity (%) | 44.81 | 45.80 |
| Cu (%) | 0.01 | 0.0079 |
| Zn (%) | 0.0083 | 0.0088 |
| Fe (%) | 5.3711 | 4.7342 |
| Mn (%) | 0.0711 | 0.07 |
| Mb (%) | 0.0001 | 0.0001 |
| Ni (%) | 0.0054 | 0.0054 |
| Cl (%) | 0.0043 | 0.0067 |
| B (%) | 0.0009 | 0.0008 |
| Ca (%) | 0.0015 | 0.0007 |
| Mg (%) | 0.0001 | 0.0002 |
| S (%) | 0.0056 | 0.0106 |
| Crop yield | 38 Quintal/Acre | 44 Quintal/Acre |

The results showed that chemical properties improved significantly with application of additive along with fertilizer as compared to fertilizer alone. Further, the yield of crop improved with application of additive along with fertilizer as compared to fertilizer alone.

Spinach—

The study was carried out at the Village of Kareli in Bharuch District (Gujarat). The plot was divided in two parts and size of each plot was 20 m$^2$. Additive 9 prepared in Experiment 1 was used for the studies. The results pertaining to changes in chemical properties of soil are presented in Table-18.

TABLE 18

| Parameters | Fertilizer | Additive + Fertilizer |
|---|---|---|
| pH | 7.96 | 8.1 |
| Conductance (mmho/cm) | 0.484 | 0.867 |
| Salinity (%) | 0.0199 | 0.073 |
| C:N Ratio | 39:1 | 40:1 |
| TOC (%) | 0.78 | 0.4 |
| Nitrogen (%) | 0.0227 | 0.01 |
| P (%) | 1.92 | 0.58 |
| K (%) | 0.0304 | 0.03 |
| B. Density (gm/cm$^3$) | 1.24 | 1.23 |
| Porosity (%) | 42.68 | 47.09 |
| Cu (%) | 0.01 | 0.01 |
| Zn (%) | 0.006 | 0.0057 |
| Fe (%) | 3.57 | 4.82 |
| Mn (%) | 0.0701 | 0.0786 |
| Ni (%) | 0.0054 | 0.0062 |
| Cl (%) | 0.0108 | 0.04 |
| B (%) | 0.0014 | — |
| Ca (%) | 0.0039 | 0.0092 |
| Mg (%) | 0.0004 | 0.0009 |
| S (%) | 0.0049 | 0.008 |

The results showed that chemical properties improved significantly with application of additive along with fertilizer as compared to fertilizer alone.

Experiment-8: Effect of Additive Prepared in Accordance with the Present Disclosure on Different Types of Soil (Observation Period—10 Months)

To study the effect of different additives 1, 2, 3, 9, 13 and 14 on the soil properties of different types of soils such as saline soils, clayey soil, sandy clay loam soil, black soil and hard soil, the 600 grams of additive cake was dissolved in 15 liters of water to obtain a slurry or dispersion. The dispersion was applied on the different soil types such as saline soil, clayey soil, sandy clay loam soil, medium black soil and hard soil by drop method or spray method. The effect of different additives on different types of soils is summarized in Table 19.

TABLE 19

| Additive | Soil Type | Result |
|---|---|---|
| Additive no. 1 | Saline soils | Accelerates sodium (Na) ion leaching, increase soil total organic carbon (TOC), and the percentage of water-stable aggregates. Decreases the exchangeable sodium percentage (ESP), soil electrical conductivity (EC) and soil salinity. |
| Additive no. 2 | Clayey soils | Improvement in Soil cation exchange capacity (CEC), Permeability, Increase soil total organic carbon (TOC) and decreases soil pH developing suitable medium for plant growth. |
| Additive no. 9 | Sandy clay loam soil | Prevent against soil erosion and abiotic stress, and increases soil total organic carbon (TOC) and microbial biomass in soil developing more fertile soil for plant growth. |
| Additive no. 3 | Sandy clay loam soil | Prevents leaching of essential nutrients and increase soil total organic carbon (TOC) and bulk density of soil. |
| Additive no. 1 or 13 | Medium black soil | Increases soil porosity, soil total organic content (TOC), soil cation exchange capacity (CEC) and decreases soil bulk density. |
| Additive no. 14 | Hard Soil | Increase in soil porosity in short period of time resulting in rate of respiratory activity of roots of plant increases leading to increase in transpiration rate and photosynthesis rate. Increases the biological availability of phosphate. |

The summary showed that due to the use of different additives the physico-chemical properties of the soil improved.

Experiment-9: Effect of Additive Prepared in Accordance with the Present Disclosure on Bacterial Growth Due to Use of Additive in Different Soil (Observation Period—40 Days).

The study was carried out at the Village of Kareli in Surat District (Gujarat). The soil type of the study was clay loam soil. This study was carried out on two plots of size 3.0 m×3.0 m. In the first plot additive prepared in accordance with experiment 1 were applied and in the second plot no additive were applied. The soil samples were periodically collected chemical and physical analysis. The results are summarized in Table 20.

TABLE 20

| | | | After 17 Days | | After 40 Days | |
|---|---|---|---|---|---|---|
| Sr. No. | Parameter | Pre Soil | With Additive (1$^{st}$ Post Soil) | W/O Additive (1$^{st}$ Post Soil) | With Additive (2$^{nd}$ Post Soil) | W/O Additive (2$^{nd}$ Post Soil) |
| 1 | TOC (%) | 1.38 | 1.13 | 1.05 | 0.69 | 0.63 |
| 2 | Available N (mg/kg) | 765 | 286 | 205 | 361.49 | 389.9 |
| 3 | Available P$_2$O$_5$ (mg/kg) | 252 | 0.351 | 0.274 | 0.65 | 0.643 |
| 4 | Available K$_2$O (mg/kg) | 1152 | 2288 | 2281 | 0.124 | 0.12 |
| 5 | Iron as Fe (mg/kg) | 55.68 | 29.57 | 29.54 | 34.16 | 29.59 |
| 6 | Manganese as Mn (mg/kg) | 29.43 | 14.57 | 14.53 | 73.62 | 81.48 |
| 7 | Zinc as Zn (mg/kg) | 1.8 | 0.708 | 0.475 | 66.72 | 3.47 |
| 8 | Copper as Cu (mg/kg) | 6.2 | 1.58 | 1.25 | 4.49 | 6.59 |

TABLE 20-continued

|  |  |  | After 17 Days | | After 40 Days | |
|---|---|---|---|---|---|---|
| Sr. No. | Parameter | Pre Soil | With Additive (1st Post Soil) | W/O Additive (1st Post Soil) | With Additive (2nd Post Soil) | W/O Additive (2nd Post Soil) |
| 9 | Boron as B (mg/kg) | 4.4 | 0.475 | 0.097 | 0.59 | 0.6 |
| 10 | Exchangeable Na (%) | 3.1 | 2.39 | 3.11 | 6.42 | 7.24 |
| 11 | Exchangeable Ca (meq/100 gm) | 53.53 | 53.4 | 54.5 | 55.1 | 55.99 |
| 12 | Exchangeable Mg (meq/100 gm) | 14.6 | 16.7 | 11.11 | 13.95 | 15.32 |
| 13 | Exchangeable K (meq/100 gm) | 24.52 | 4.84 | 4.83 | 2.557 | 2.569 |
| 14 | Exchangeable Na (meq/100 gm) | 2.96 | 1.83 | 2.26 | 9.251 | 7.392 |
| 15 | pH | 7.96 | 8.21 | 8.27 | 8.81 | 8.58 |
| 16 | Electrical Conductivity (µmho/cm) | 859 | 1287 | 1239 | 946 | 788 |
| 17 | Infiltration Rate (mm/hr) | 5.2 | 5.1 | 5.3 | 3.9 | 4.2 |
| 18 | Bulk Density (gm/cm$^3$) | 1.65 | 1.7 | 1.68 | 1.25 | 1.28 |
| 19 | Porosity (%) | 50.65 | 50.63 | 48.11 | 48.21 | 49.75 |
| 20 | Moisture (%) | 9.37 | 20.71 | 17.67 | 21.57 | 19.57 |
| 21 | Total Bacterial Count (cfu/gm) | $1.8 \times 10^4$ | $3.1 \times 10^7$ | $1.6 \times 10^8$ | $2.1 \times 10^4$ | $2.1 \times 10^3$ |
| 22 | SRB (/25 gm) | Present | Present | Present | Present | Present |
| 23 | *Pseudomonas* (/gm) | Absent | Absent | Absent | Absent | Absent |
| 24 | Nitrifying Bacteria (cfu/gm) | $2.3 \times 10^6$ | $2.8 \times 10^3$ | $8.5 \times 10^2$ | $2.3 \times 10^4$ | $3.0 \times 10^7$ |
| 25 | Organic Carbon (%) | 1.02 | 0.83 | 0.77 | 0.51 | 0.46 |
| 26 | Sulphur (mg/kg) | 0.9 | 0.72 | 0.61 | 0.0047 | 0.005 |
| 27 | Total Nitrogen (%) | 0.12 | 0.15 | 0.03 | 0.031 | 0.064 |
| 28 | C:N Ratio | 11.5:1 | 7.5:1 | 35.1 | 22.2:1 | 9.8:1 |
| 29 | Water Holding Capacity (%) | 79.8 | 90.32 | 90.69 | 59.84 | 69.5 |
| 30 | CEC (Cation Exchange No.) (meq/100 gm) | 95.61 | 38.27 | 31.7 | 64.33 | 60.15 |
| 31 | BOD (mg/kg) | 10 | 168 | 527 | 316 | 85 |

The total bacterial count and nitrifying bacteria measured after 17 days clearly indicated that total bacterial count and nitrifying bacteria in soil was increased in presence of additive used with increased in cation exchange capacity (CEC) number and biological oxygen demand (BOD) of soil as compared to no application of additive. After 40 days results indicated that there was higher total bacterial count in presence of additive against no application of additive. Also after 40 days results indicated that there was decrease in bulk density of soil in presence of additive over no application of additive. Further, results indicated that there was improvement of soil properties in presence of additive over no application of additive.

The foregoing description of the embodiments has been provided for purposes of illustration and not intended to limit the scope of the present disclosure. Individual components of a particular embodiment are generally not limited to that particular embodiment, but, are interchangeable. Such variations are not to be regarded as a departure from the present disclosure, and all such modifications are considered to be within the scope of the present disclosure.

Technical Advancements

The present disclosure described herein above has several technical advantages including, but not limited to, the realization of an additive, agricultural composition and kit-of-parts, additive is stable and aids in conditioning of the soil, improving soil properties, providing nourishment to plants and thereby improving plant growth and improvement of crop yield.

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The foregoing description of the specific embodiments so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The use of the expression "at least" or "at least one" suggests the use of one or more elements or ingredients or quantities, as the use may be in the embodiment of the disclosure to achieve one or more of the desired objects or results.

Any discussion of documents, acts, materials, devices, articles or the like that has been included in this specification is solely for the purpose of providing a context for the disclosure. It is not to be taken as an admission that any or all of these matters form a part of the prior art base or were common general knowledge in the field relevant to the disclosure as it existed anywhere before the priority date of this application.

The numerical values mentioned for the various physical parameters, dimensions or quantities are only approximations and it is envisaged that the values higher/lower than the numerical values assigned to the parameters, dimensions or quantities fall within the scope of the disclosure, unless there is a statement in the specification specific to the contrary.

While considerable emphasis has been placed herein on the components and component parts of the preferred embodiments, it will be appreciated that many embodiments can be made and that many changes can be made in the preferred embodiments without departing from the principles of the disclosure. These and other changes in the preferred embodiment as well as other embodiments of the disclosure will be apparent to those skilled in the art from the disclosure herein, whereby it is to be distinctly understood that the foregoing descriptive matter is to be interpreted merely as illustrative of the disclosure and not as a limitation.

The invention claimed is:

1. An additive for improving soil condition, the additive comprising:
   a. a mixture of esters of fatty acids; and
   b. an emulsifying agent;
   wherein said mixture of esters of fatty acids consists of PEG 6000 distearate in an amount of 70 wt % and glycerol monostearate in an amount of 25 wt % of total weight of additive; and
   wherein said emulsifying agent is polyoxyethylene 10 tridecylether in an amount of 5 wt % of the total weight of the additive, for conditioning saline soil.

2. An additive for improving soil condition, the additive comprising:
   a. a mixture of esters of fatty acids; and
   b. an emulsifying agent;
   wherein said mixture of esters of fatty acids consists of PEG 6000 distearate in an amount of 65 wt % and glycerol monostearate in an amount of 10 wt % of total weight of additive; and
   wherein said emulsifying agent is polyoxyethylene 10 tridecylether in an amount of 25 wt % of the total weight of the additive, for conditioning clayey soil.

3. An additive for improving soil condition, the additive comprising:
   a. a mixture of esters of fatty acids; and
   b. an emulsifying agent;
   wherein said mixture of esters of fatty acids consists of PEG 6000 distearate in an amount of 45 wt %, glycerol monostearate in an amount of 20 wt % and PEG-150 pentaerythrityl tetrastearate in an amount of 25 wt % of total weight of additive; and wherein said emulsifying agent is polyoxyethylene 10 tridecylether in an amount of 10 wt % of total weight of additive, for conditioning sandy clay loam soil.

4. An additive for improving soil condition, the additive comprising:
   a. a mixture of esters of fatty acids; and
   b. an emulsifying agent;
   wherein said mixture of esters of fatty acids consists of PEG 6000 distearate in an amount of 45 wt % and glycerol monostearate in an amount of 45 wt % of total weight of additive; and
   wherein said emulsifying agent is polyoxyethylene 10 tridecylether in an amount of 10 wt % of total weight of additive, for conditioning sandy clay loam soil.

5. An additive for improving soil condition, the additive comprising:
   a. a mixture of esters of fatty acids; and
   b. an emulsifying agent;
   wherein said mixture of esters of fatty acids consists of PEG 6000 distearate in an amount of 85 wt % and glycerol monostearate in an amount of 10 wt % of total weight of additive; and
   wherein said emulsifying agent is polyoxyethylene 10 tridecylether in an amount of 5 wt % of total weight of additive, for conditioning medium black soil.

6. An additive for improving soil condition, the additive comprising:
   a. a mixture of esters of fatty acids;
   b. an emulsifying agent;
   wherein said mixture of esters of fatty acids consists of PEG 6000 distearate in an amount of 5 wt % and glycerol monostearate in an amount of 80 wt % of total weight of additive; and wherein said emulsifying agent is polyoxyethylene 10 tridecylether in an amount of 15 wt % of total weight of additive, for conditioning hard soil.

* * * * *

UNITED STATES PATENT AND TRADEMARK OFFICE
CERTIFICATE OF CORRECTION

| | |
|---|---|
| PATENT NO. | : 10,975,303 B2 |
| APPLICATION NO. | : 16/555190 |
| DATED | : April 13, 2021 |
| INVENTOR(S) | : Shreyas Narendrakumar Shah et al. |

It is certified that error appears in the above-identified patent and that said Letters Patent is hereby corrected as shown below:

On the Title Page

Column 1, Item (30), please insert Foreign Application Priority Data:
--February 26, 2018 (IN) ......................201821007239
December 22, 2018 (IN).................201821048783--.

Signed and Sealed this
Twenty-fourth Day of May, 2022

Katherine Kelly Vidal
*Director of the United States Patent and Trademark Office*